US009495008B2

(12) United States Patent
Savastinuk et al.

(10) Patent No.: US 9,495,008 B2
(45) Date of Patent: Nov. 15, 2016

(54) DETECTING A PRIMARY USER OF A DEVICE

(71) Applicant: Amazon Technologies, Inc., Reno, NV (US)

(72) Inventors: Paul Aksenti Savastinuk, Shoreline, WA (US); Geoffrey Scott Heller, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 54 days.

(21) Appl. No.: 14/318,060

(22) Filed: Jun. 27, 2014

(65) Prior Publication Data
US 2015/0378433 A1    Dec. 31, 2015

(51) Int. Cl.
*G06F 3/01*    (2006.01)
*G06K 9/00*   (2006.01)
*G06F 21/32*  (2013.01)
*G06F 3/0346* (2013.01)

(52) U.S. Cl.
CPC .............. *G06F 3/015* (2013.01); *G06F 3/011* (2013.01); *G06F 3/012* (2013.01); *G06F 3/0346* (2013.01); *G06F 21/32* (2013.01); *G06K 9/00255* (2013.01); *G06F 2200/1637* (2013.01); *G06F 2203/0381* (2013.01); *G06F 2221/2133* (2013.01)

(58) Field of Classification Search
None
See application file for complete search history.

(56) References Cited

U.S. PATENT DOCUMENTS

| 6,570,498 | B1 | 5/2003 | Frost |
| 2010/0205541 | A1* | 8/2010 | Rapaport ............... G06Q 10/10 715/753 |
| 2012/0075463 | A1 | 3/2012 | Chen |
| 2012/0249287 | A1* | 10/2012 | Levien ................... G09G 5/00 340/5.1 |
| 2013/0091462 | A1 | 4/2013 | Gray |
| 2013/0288647 | A1 | 10/2013 | Turgeman |

OTHER PUBLICATIONS

Olsen, Scientists Uncover Invisible Motion in Video, nytimes.com, Feb. 27, 2013.
Wu, Eulerian Video Magnification for Revealing Subtle Changes in the World, csail.mit.edu, Siggraph 2012.
(Continued)

*Primary Examiner* — Nicholas Lee
*Assistant Examiner* — Duane N Taylor, Jr.
(74) *Attorney, Agent, or Firm* — Seyfarth Shaw LLP; Ilan N. Barzilay

(57) ABSTRACT

A device may identify a user among multiple individuals detected by comparing a physiological condition, such as a heart rate, of the multiple detected individuals as detected by a camera of the device with a physiological condition of a user of the device using different sensors. A heart rate may be detected by a camera by monitoring blood flow to an individual's face. A heart rate may be detected by a motion sensor by monitoring vibrations of the device that are in an expected frequency range. If a heart rate of a user matches a heart rate of an individual seen by a camera, that individual may be determined to be the user of the device. The position of the individual may be used to then render a user interface.

17 Claims, 18 Drawing Sheets

(56) References Cited

OTHER PUBLICATIONS

Wu, Eulerian Video Magnification for Revealing Subtle Changes in the World, MIT CSAIL, Quanta Research Cambridge, Inc.
Wu, Eulerian Video Magnification for Revealing Subtle Changes in the World, Power Point Presentation, Quanta Research, Cambridge, Inc., Siggraph 2012.
International Search Report of PCT/US2015/037315, Mailed Sep. 23, 2015, Applicant: Amazon Technologies, Inc, 11 pages.

* cited by examiner

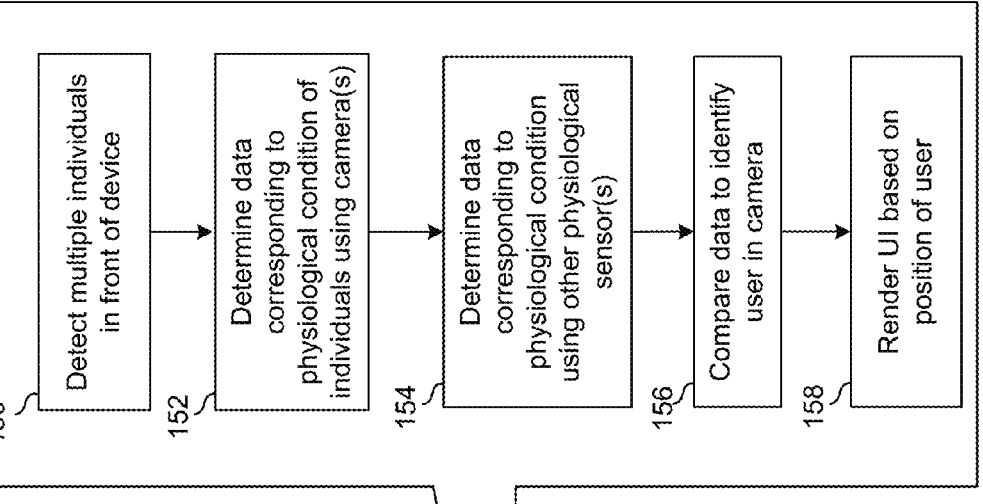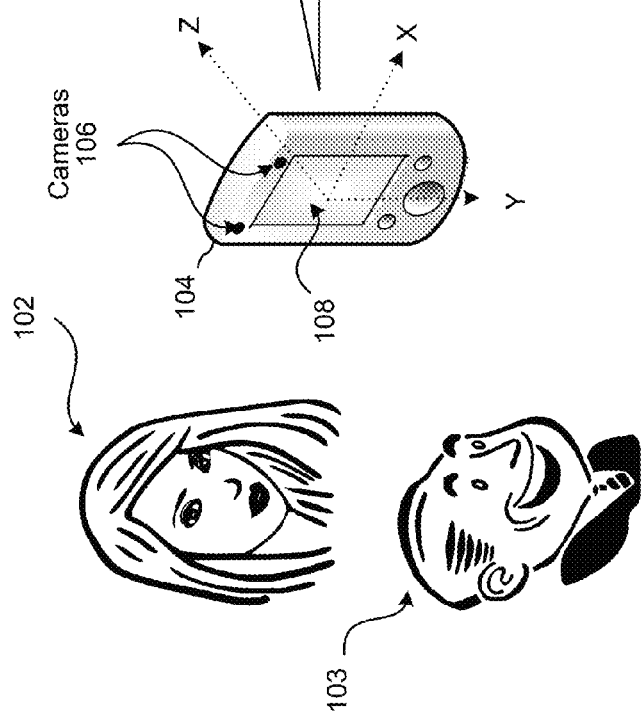
FIG. 1A

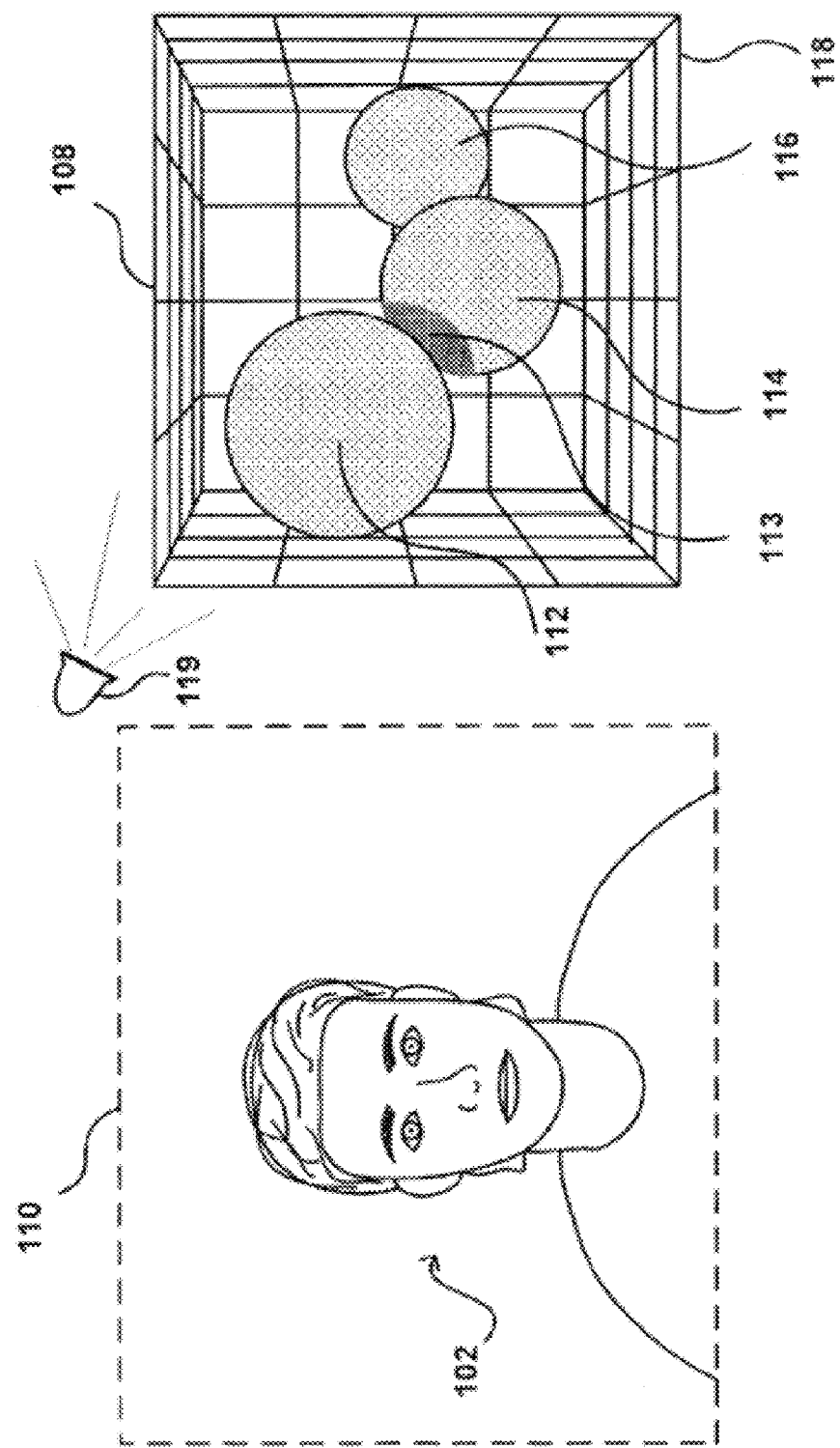

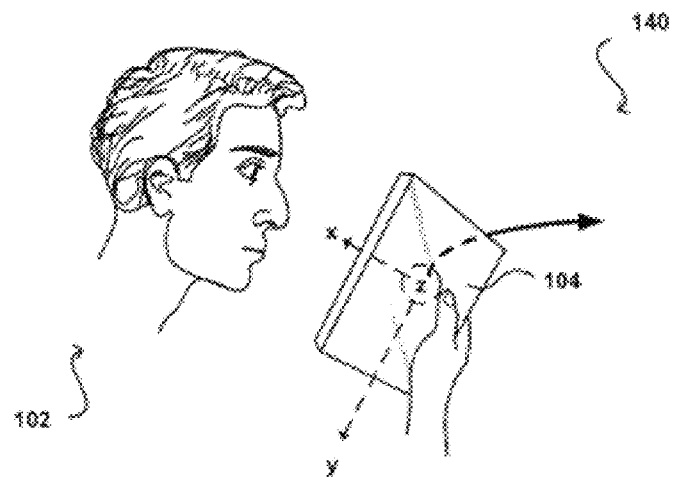
FIG. 1G
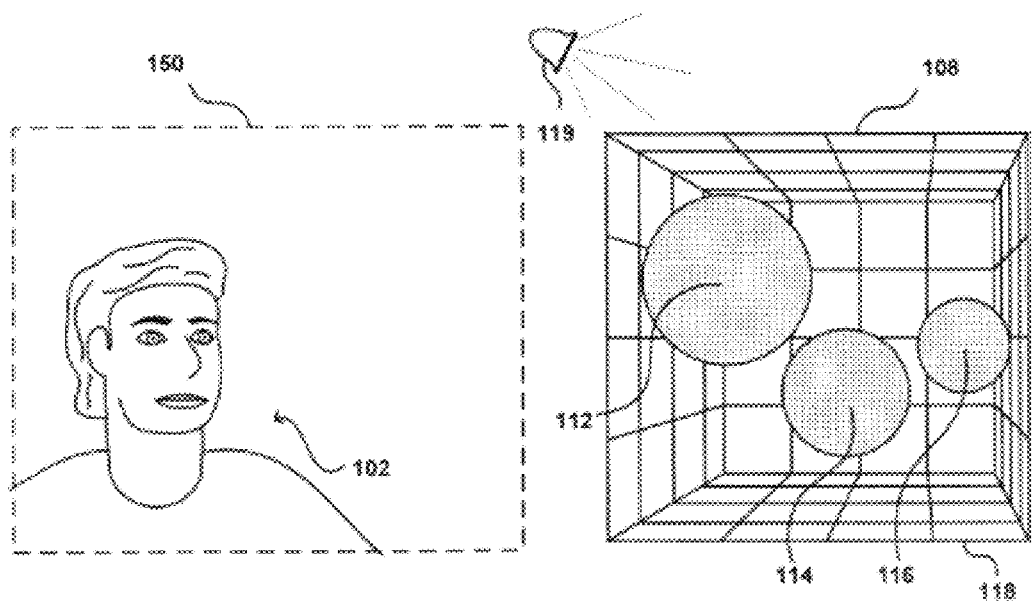
FIG. 1H
FIG. 1I

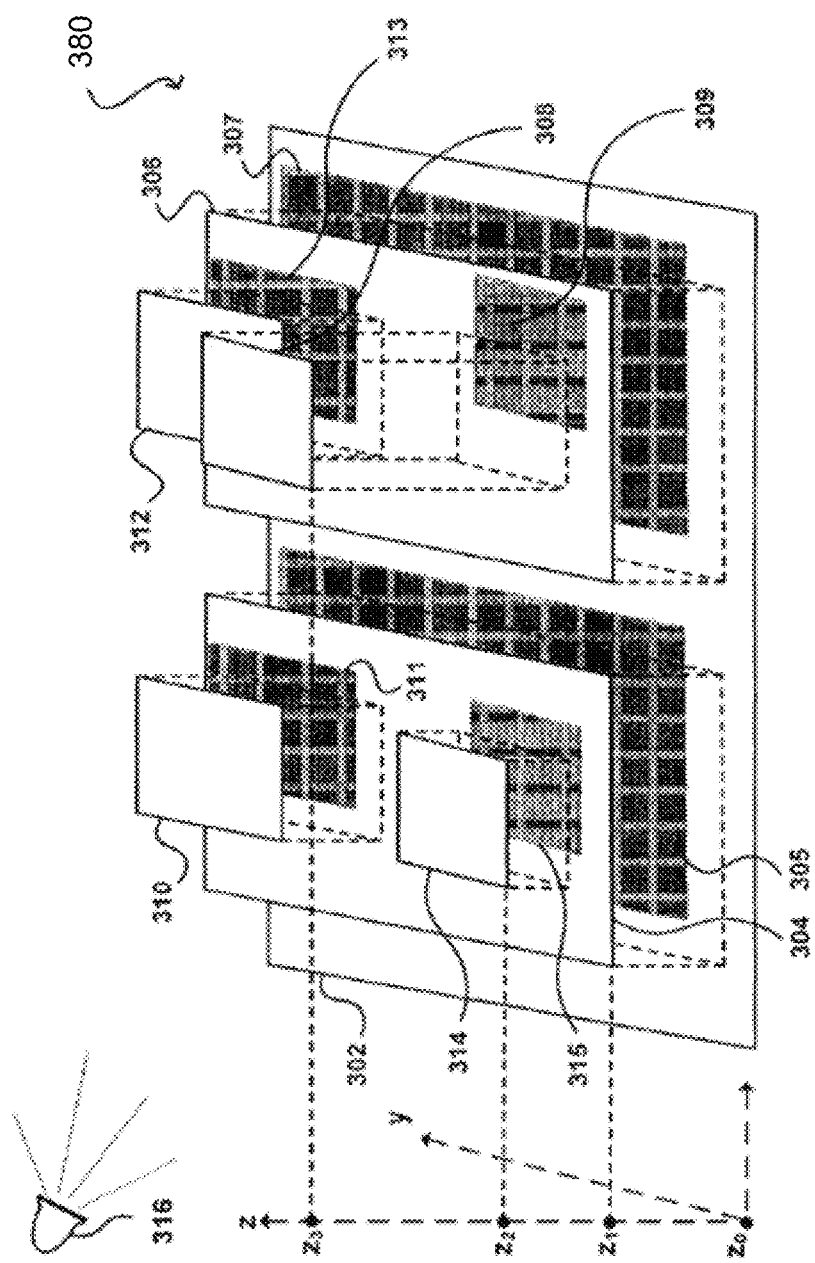

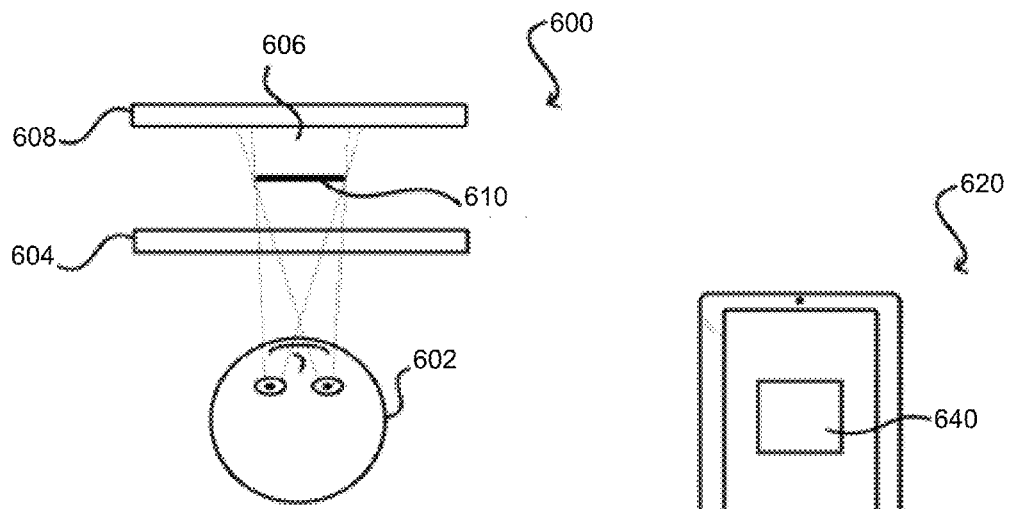
FIG. 6A
FIG. 6B
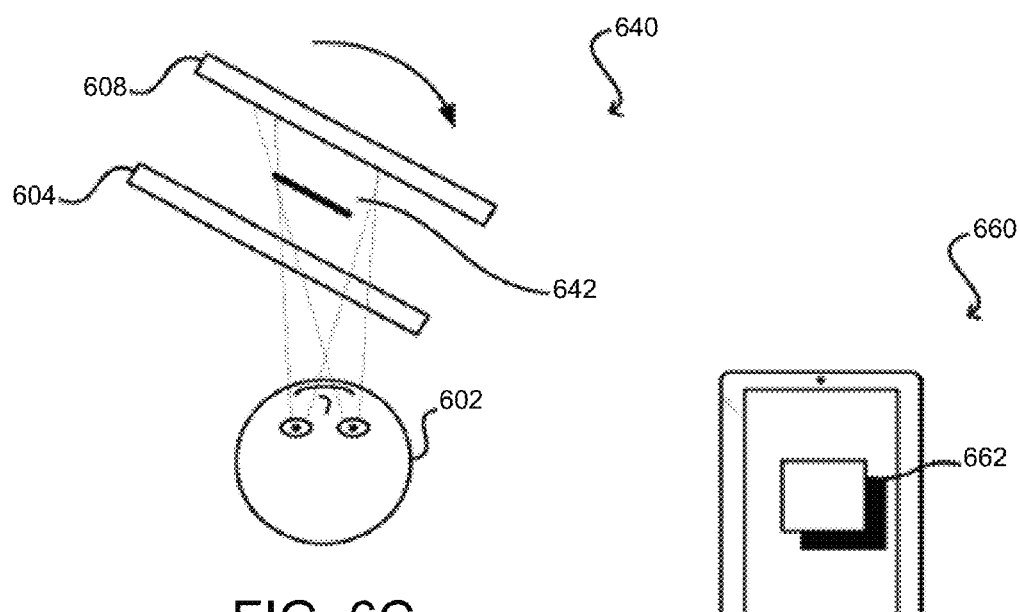
FIG. 6C
FIG. 6D

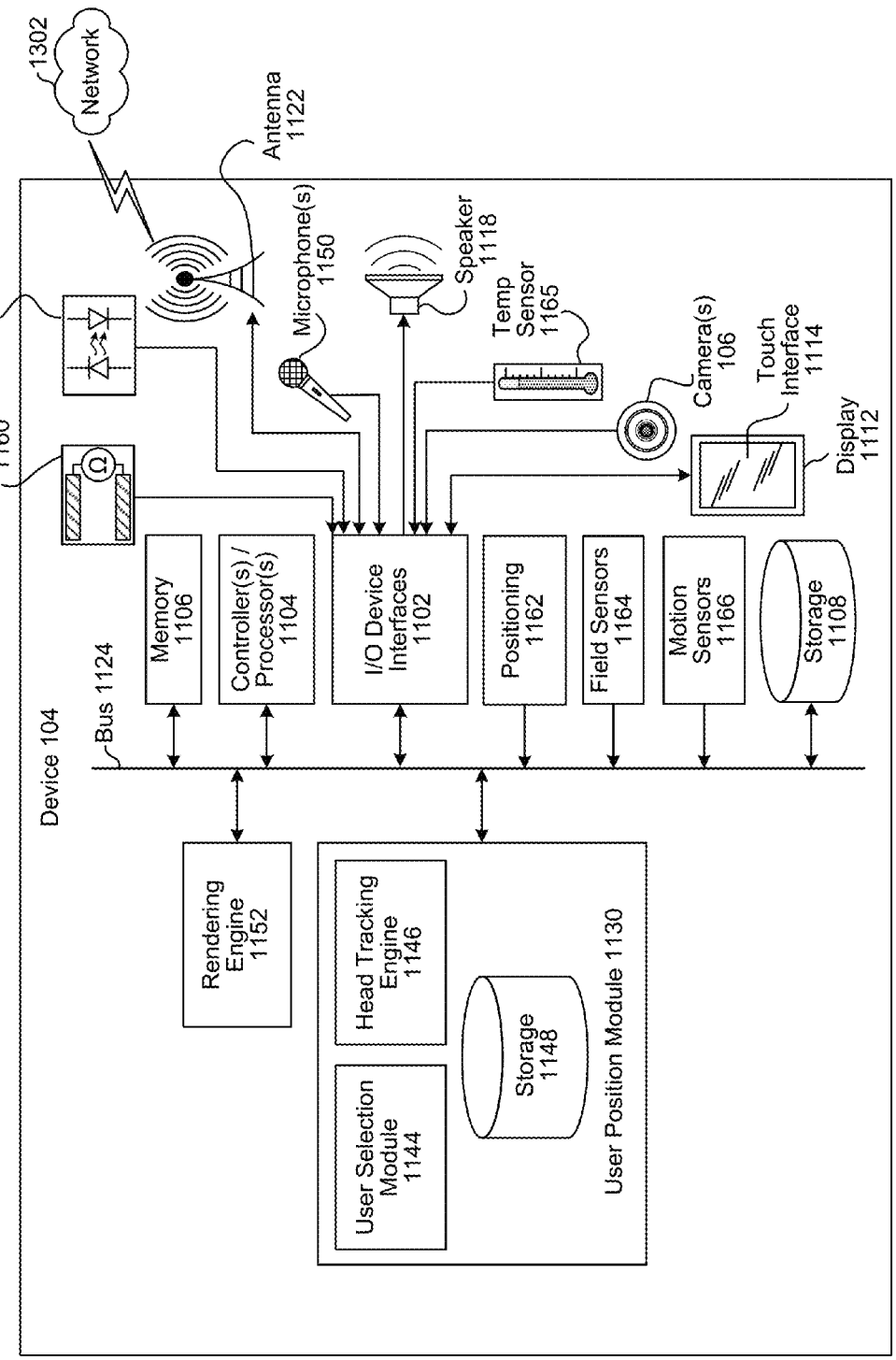

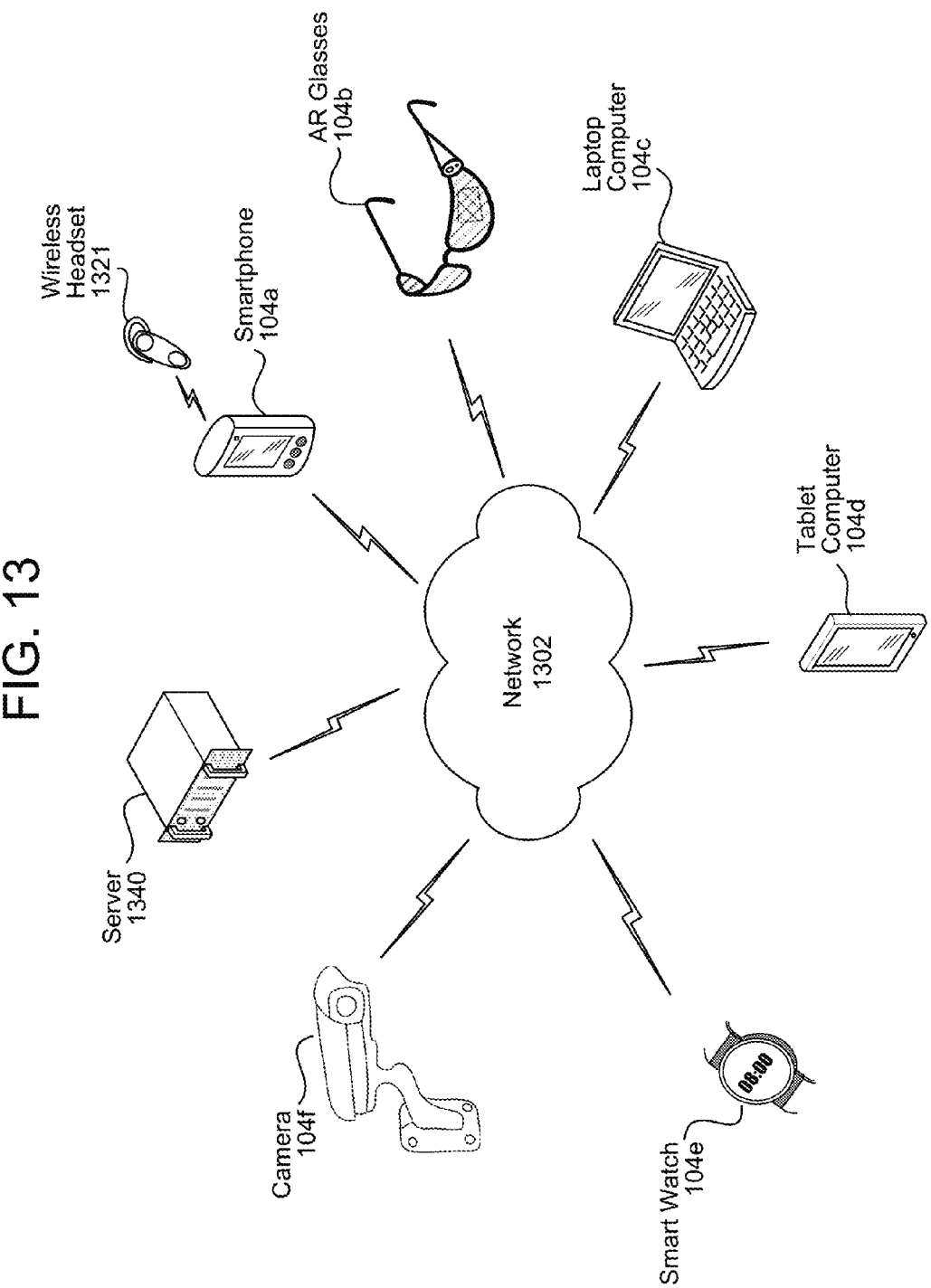

DETECTING A PRIMARY USER OF A DEVICE

BACKGROUND

Handheld electronic devices regular include navigation capability and often include features to determine device orientation or other internal sensors. Some devices have multiple radios, including WiFi and Bluetooth. Many also provide a graphical user interface (GUI) and touch screen via which the user may interact with the GUI.

BRIEF DESCRIPTION OF THE DRAWINGS

For a more complete understanding of the present disclosure, reference is now made to the following description taken in conjunction with the accompanying drawings.

FIG. 1A illustrates an example approach for detecting a user of a device in accordance with various embodiments;

FIGS. 1B-1I illustrate an example approach for providing a user interface that is based on tracking of a head or face of a user in accordance with various embodiments;

FIGS. 3A-3E illustrate an example user interface that simulates depth in accordance with various embodiments;

FIGS. 6A-6D illustrate example approaches to determining changes in the relative viewing angle for a user in accordance with various embodiments;

FIG. 11 is an example block diagram conceptually illustrating example components of a device in accordance with various embodiments;

FIG. 13 illustrates an example of a computer network.

DETAILED DESCRIPTION

Figure 1D:
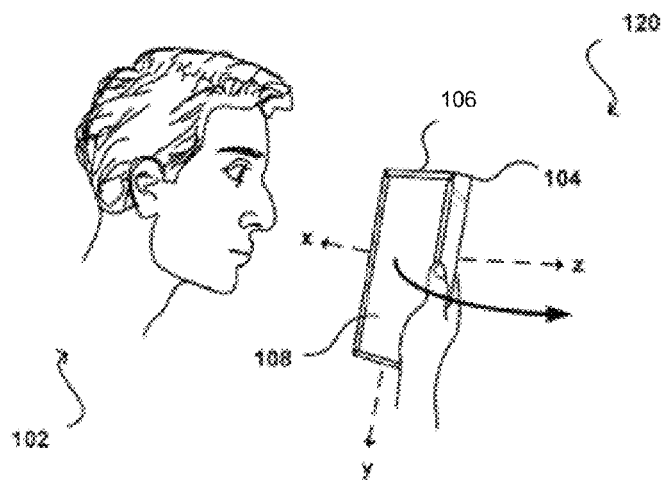

Certain computing devices may be configured with position based user interfaces. Such position based user interfaces may alter their appearance based on a user position relative to the device operating the user interface (UI). Such devices may determine relative user position using a number of techniques, include head detection. If a user's head is detected directly in front a device, graphical elements of the UI (such as icons, images, etc.) may display normally (as in a head on view). When a user's head is detected askew from the device, for example to the left or right by some amount, the UI may alter its display to show graphical elements or other content of the UI as if from an angle. In this manner the UI may create certain visual effects such as three dimensional (3D) effects, parallax, depth of UI graphical elements, or other effects.

One problem with a position-based UI surfaces when the cameras of a device detect more than one head, such as when two people are viewing the display of a device. The device may become confused as to which head to use as the basis from which to render the UI. To solve that problem, a method is offered that determines which detected face belongs to the actual user (as opposed to the onlooker) by comparing a physiological condition of the detected individuals using different systems of the device. For example, a device may use its camera(s) to determine a pulse rate for each of the detected faces (using techniques described below). The device may separately use one or more physiological sensors (either incorporated into the device or in communication with the device) to detect the pulse rate of the individual holding the device (using techniques also described below). With the pulse rates determined using the different systems, the device may compare the pulse rates determined using the cameras with the pulse rates determined using the physiological sensors. The device can then determine that a particular face belongs to the user holding the device by determining which face has a pulse rate that matches the pulse rate determined by the physiological sensors. That face may then be selected as the user's face and the position of the user's face may then be used to render the UI. As discussed below, other variations, including identifying the user based on other physiological conditions, are also possible.

FIGS. 1A-1I illustrate an example approach for providing a user interface that is based on tracking of a head or face of a user in accordance with an embodiment. In the example situation 100 of FIG. 1A, a user 102 can be seen viewing a display screen 108 of a computing device 104. Although a portable computing device (e.g., a smart phone, tablet, or portable media player) is shown that can be held in the user's hands, it should be understood that other types of computing devices can utilize aspects of the various embodiments as should be apparent in light of the teachings and suggestions contained herein. For example, the computing device may be a video game console, desktop computer, home media device, etc. The computing device may have a number of components incorporated into the device or in communication with the device either through a physical connection (e.g., plug) or wireless connection (e.g., Bluetooth connection). The various components may include a camera, biometric sensor, touch surface, etc. as described in various locations below, for example in reference to FIG. 11. The computing device can include at least one camera 106 located on the front of the device and the on same surface as the display screen to capture image data of subject matter facing the front of the device, such as the user 102 viewing the display screen. It should be understood that, while the components of the example device are shown to be on a "front" of the device, there can be similar or alterative components on the "top," "side," or "back" of the device as well (or instead). Further, directions such as "top," "side," and "back" are used for purposes of explanation and are not intended to require specific orientations unless otherwise stated. In some embodiments, a computing device may also include more than one camera on the front of the device and/or one or more cameras on the back (and/or sides) of the device capable of capturing image data facing the back surface (and/or top, bottom, or side surface) of the computing device. In this example, the camera 106 comprises a digital camera incorporating a CMOS image sensor. In other embodiments, a camera of a device can incorporate other types of image sensors (such as a charged couple device (CCD)) and/or can incorporate multiple cameras, including at least one wide-angle optical element, such as a fish eye lens, that enables the camera to capture images over a wide range of angles, such as 180 degrees or more. Further, each camera can comprise a digital still camera, configured to capture subsequent frames in rapid succession, or a video camera able to capture streaming video. In still other embodiments, a computing device can include other types of imaging elements, such as ambient light sensors, IR sensors, and other optical, light, imaging, or photon sensors.

As shown in FIG. 1A, a device 104 may detect multiple individuals (such as user 102 and onlooker 103) in front of the device (150). The device may determine data corresponding to a physiological condition of the detected individuals using data from the device's cameras 106 (152). That data may include, for example, video data that shows the blood flow to the respective faces to detect their respective pulses, as described below. The device may then determine data corresponding to a physiological condition of the detected individuals using data from physiological sensors (or other sensors) associated with the device (154). The data from the physiological sensors may correspond to the user holding the device, even while the device may not yet know which individual face (102 or 103) corresponds to the user holding the device. This physiological data may include, for example, data regarding vibration/movement of the device 104 that corresponds to a frequency associated with the user's pulse. The device may then compare the data obtained from the cameras to the data obtained from the other sensors (156). For example, the device may match the motion sensor pulse to the pulses of the respective faces. The face that has a pulse that matches the pulse detected by the motion sensors is determined to be the user. The device 104 may then determine the position of the user relative to the device and render the user interface (UI) based on the position of the user (158).

As illustrated in FIG. 1B, when the user 102 positions the computing device in front of himself and gazes directly towards the display screen such that the x-y plane of the device is perpendicular or substantially perpendicular to the user's line of sight (where the lateral axis corresponds to the x-axis, the longitudinal axis corresponds to the y-axis, and the depth of the device corresponds to the z-axis), the image data captured by the front-facing camera of the device can include the image 110. Although one image is shown to be captured in this instance, it will be appreciated that multiple images captured by a same camera at successive times, multiple images captured by multiple cameras at the same time or substantially the same time, or some combination thereof can be analyzed in various embodiments. Further, other embodiments may additionally or alternatively use other approaches, such as proximity sensors, to determine the position of the user relative to the device and/or the viewing angle of the user with respect to the device. In this example, the device is capable of rendering one or more graphical elements for display on the two-dimensional display screen according to a viewing angle of the user with respect to the display screen. The device can rely on the position of the head or face of the user with respect to the device and/or the apparent motion of the user's head or face with respect to the device to draw or render one or more graphical elements on the display screen so as to simulate depth.

FIG. 1C illustrates an example of a user interface presented on the display screen 108 based on the user's viewing angle with respect to the device. The user interface includes three user interface elements 112, 114, and 116 displayed within a 3D grid 118. UI elements 112, 114, and 116 may be buttons for a user application that would normally appear to be the same size and shape to the user. However, here, UI elements 112, 114, and 116 have each been scaled to give the user the impression that the UI elements are associated with different depths. In particular, UI element 112 appears to be at a depth closest to the user and corresponds to a largest scale, UI element 114 appears to be positioned at an intermediate depth and corresponds to an intermediate scale, and UI element 116 appears to be at depth furthest away from the user and corresponds to the smallest scale. It will be appreciated that other transformations can also be applied to UI elements to simulate depth, including rotations, translations, perspective projections, among other transformations. To further enhance an impression that the user interface has depth, a virtual light source 119 may be positioned off-screen at the top left corner of a 3D grid-box 118. As mentioned, the shadows generated by a virtual light source can depend on the color, intensity, direction, position, and/or falloff function of the light source. Further, the light source can be modeled as a directional light, a point light, or a spotlight. A directional light is produced by a light source at an infinite distance from the scene and all of the rays emanating from the light source strike UI elements from a single parallel direction and with equal intensity everywhere. A point light, as in the example of FIG. 1C, is a light that gives off equal amounts of light in all directions. UI elements closer to the light may appear brighter than those further away. A spotlight is a light that radiates light in a cone with more light emanating from the center of the cone and gradually tapering off the further the away from the center. Modeling a light source based on one of a directional light, point light, or spotlight is known to those of ordinary skill in the art, and will not be discussed in detail herein. In some embodiments, the virtual light source may not be fixed as in the example of FIGS. 1C, 1F, and 1I. Instead, the virtual light source may be positioned with respect to a user and/or a computing device such that when the user and/or computing device move, the virtual light source also moves with the user and/or computing device.

Figures 1E, 1F:
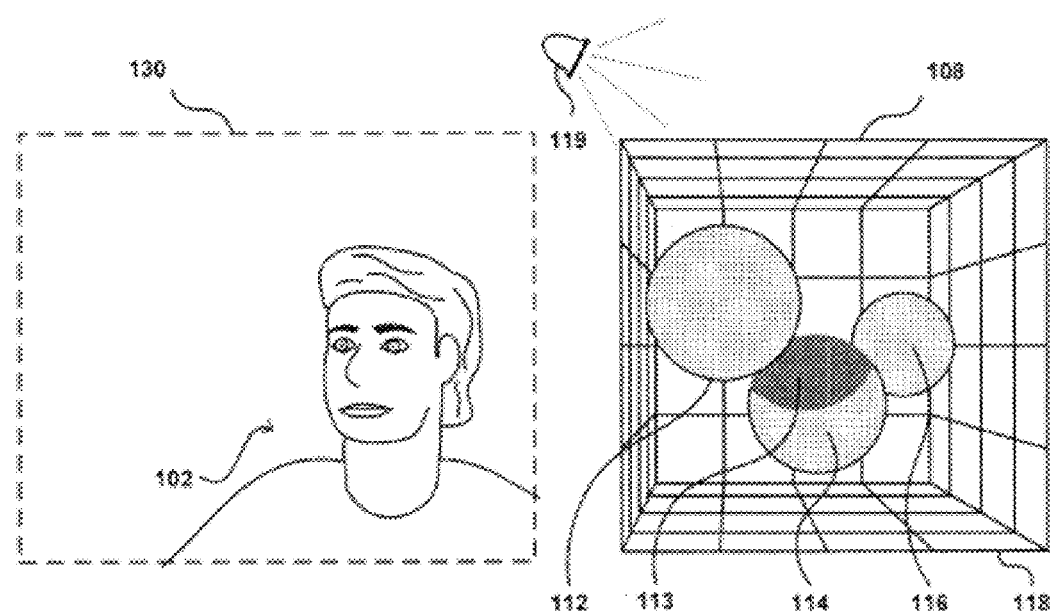

In FIG. 1D, an example situation 120 illustrates that the user 102 has tilted the computing device 104 to the right with respect to the user, i.e., the user has rotated the device to his right along the longitudinal or y-axis. As seen in FIG. 1E, the tilt or rotation of the device causes the camera to capture a different view or perspective of the user within image 130, here, a three-quarters profile of the head or face of the user facing leftward. The position of the user's face may also be shifted towards a right region of the image 130 because of the rightward tilt or rotation of the device. In this example, the apparent motion of the face or head of the user (which may be primarily due to the motion of the device) can be tracked from the initial position detected in FIG. 1B to the new position depicted in FIG. 1E. Based on the apparent movement of the user's head or face, the user interface can be redrawn or rendered for display to correspond to the new viewing angle of the user 102. For example, as illustrated in FIG. 1F, when the user tilts the device rightward, the device will apply rotations, scales, translations, perspective projections, among other transformations, to elements 112, 114, 116, and 118 based on the new viewing angle of the user. In particular, 3D grid 118 has been skewed such that the right face of the grid appears more prominently in the display screen 108 while the left face of the grid is presented at more of an oblique angle when the user rotates the device laterally to the right. UI elements 112, 114, and 116 are also redrawn or rendered to correspond to the new viewing angle of the user with respect to the device. Further, shadow 113 has been recast to be consistent with the off-screen virtual light source 119 and the transformed UI elements 112 and 114 such that shadow 113 appears much larger in FIG. 1F than in FIG. 1C.

FIG. 1G illustrates an example situation 140 wherein the user 102 has tilted the computing device 104 to the left with respect to the user, i.e., the user has rotated the device to his left along the longitudinal or y-axis. As seen in the image 150 of FIG. 1H, the tilt or rotation of the device causes the camera to capture a three-quarters profile of the head or face of the user facing rightward, and the position of the user's face has also shifted towards a left region of the image 150. In this example, the apparent movement of the face or head of the user (which, again, may be primarily due to the movement of the device) can be tracked from the previous position depicted in FIG. 1E to the new position depicted in FIG. 1H. The UI elements 112, 114, 116, and 118 can be redrawn or rendered for display based on the apparent motion of the user's head or face as seen in FIG. 1I. For example, the user may be positioned as depicted in FIGS. 1D (and 1E) and may subsequently tilt the device laterally towards his left until the user's viewing angle is perpendicular or substantially perpendicular with respect to the device as depicted in FIGS. 1A (and 1B) (e.g., the user's initial position). The UI elements presented on the display screen 108 may be rendered or animated from what is seen in FIG. 1F to what is seen in FIG. 1C. In particular, the 3D grid 118 may be unskewed or otherwise transformed, UI elements 112, 114, and 116 may be rotated, translated, scaled, or otherwise transformed back to their original projections, and shadow 113 may be recast to correspond to the position of the virtual light source 119 and/or the original projections of UI elements 112 and 114. It will be appreciated that in various embodiments, interim user positions between when the user is positioned as seen in FIGS. 1D (and 1E) and when the user is positioned as seen in FIGS. 1A (and 1B) can be detected by the device. Interim transformations can be applied to the UI elements such that there may be a smooth animation effect for the transformation of the UI elements as seen in FIG. 1F to the UI elements as seen in FIG. 1C.

As the user continues rotating the device towards his left, the user interface may transform and/or be animated from the scene depicted in FIG. 1C to the scene depicted in FIG. 1I. In particular, the 3D grid 118 may be rendered such that the left face of the grid is presented more prominently and the right face of the grid is displayed at a more oblique angle, and UI elements 112, 114, and 116 may also be rotated, translated, scaled, or otherwise transformed in accordance with the new viewing angle of the user as seen in FIGS. 1G and 1H. In this example, the new viewing angle of the user causes UI elements 112, 114, and 116 to be rendered such that they no longer overlap. As a result, UI element 112 no longer casts a shadow on UI element 114. It will be appreciated that the head or face of the user can generally be tracked according to six degrees of freedom (e.g., motion along the x-, y-, and z-axes or forward/backward, up/down, and left/right, and rotation along the x-, y-, and z-axes or pitch, yaw, and roll) and the device can be configured to appropriately respond to such various motions. For example, when the user tilts the device backwards and to his right (i.e., such that the top left corner of the device is the closest point of the device to the user), the right and bottom faces of the 3D grid 118 may be displayed more prominently and the left and top faces may be displayed less prominently. When the user tilts the device forward and towards his left (i.e., such that the bottom right corner of the device is the closest point of the device to the user), the left and top faces of the grid can be displayed with greater detail, and the right and bottom faces may be presented with fewer details. Such an approach may give a user an impression that he is interacting with the UI elements in an environment having 3D depth.

Figure 2A:
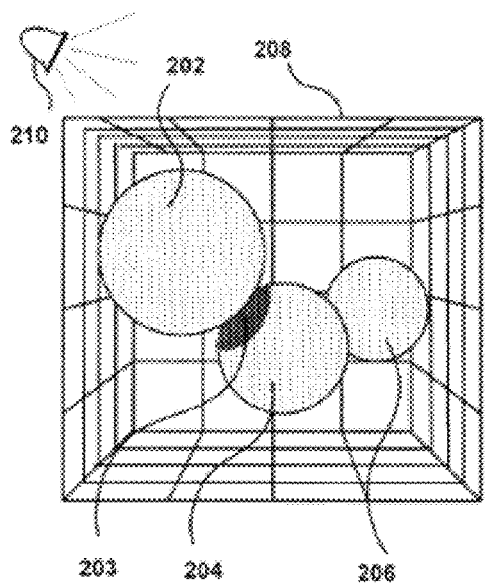
FIGS. 2A-2C illustrate an example approach for dynamically updating simulated depth for user interface elements in accordance with various embodiments.
Figure 2B:
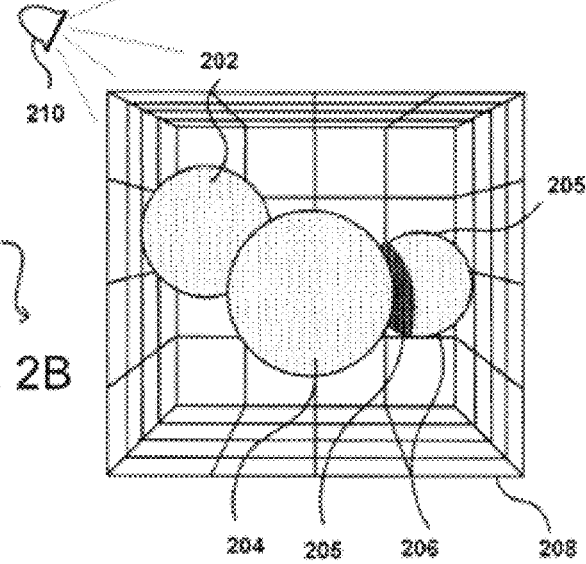
Figure 2C:
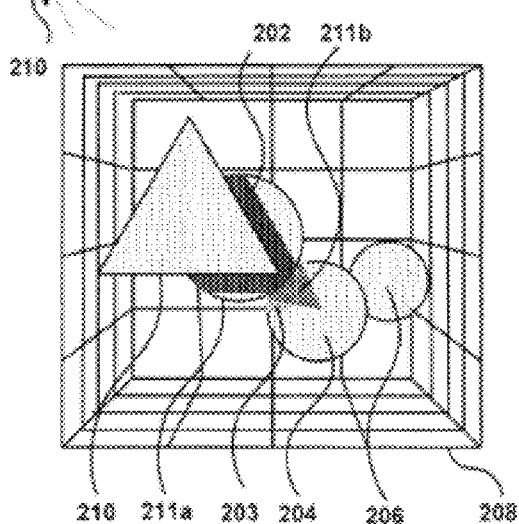

FIGS. 2A-2C illustrate an example approach of dynamically modifying the depths of UI elements in accordance with an embodiment. In FIG. 2A, an example 200 of a user interface similar to that of FIGS. 1C, 1F, and 1I is shown. The user interface includes three UI elements 202, 204, and 206 displayed within a 3D grid 208. Each of the UI elements 202, 204, 206 would normally appear to be similar in size and shape but have been transformed according to at least a scale to give a user an impression of depth. In particular, UI element 202 corresponds to a depth closest to the user and a largest scale, UI element 204 corresponds to an intermediate depth and an intermediate scale, and UI element 206 corresponds to depth furthest away from the user and a smallest scale. As mentioned, other transformations can also be applied to simulate 3D depth, such as rotations, translations, perspective projections, among other possibilities. In this example, UI element 202 can be seen overlapping an upper left portion of UI element 204, and UI element 204 can be seen overlapping a lower left portion of UI element 206. A fixed virtual light source 210 may be positioned off-screen at the upper left corner of the grid 208 such that UI element 202 casts a shadow 203 upon UI element 204. However, UI element 204 does not cast a shadow on UI element 206 because UI element 204 is positioned lower horizontally than UI element 206.

FIG. 2B illustrates an example 220 of the user interface after the user has interacted with the UI or the UI has otherwise received other input to change the state of each UI element. For instance, the UI elements could correspond to a portion of an alphanumeric keypad that uses depth cues for suggesting the most likely next key for the user to enter. After the user enters a portion of a text or a number, the device may present the next alphanumeric or numeric key corresponding to a text suggestion or number suggestion that the user is most likely attempting to enter into the computing device. The device can emphasize the next key by displaying the key at a depth closest to the user, and the device can de-emphasize other keys by positioning the other keys at depths further away from the user. Thus, in this example, UI element 204 is brought to a depth closest to the user and UI element 202 is pushed down to a lower depth. This is shown by the scale of UI element 204 being increased to the largest scale and the scale of UI element 202 being decreased to an intermediate scale. To further enhance an impression of depth of the UI, the transformations of UI elements 202 and 204 also result in UI element 204 casting a shadow 205 on UI element 206, and UI element 202 no longer casting a shadow on UI element 204.

FIG. 2C illustrates an example 240 of the user interface after the user has interacted with the UI or the UI has otherwise received other input to change the state of the UI. In this example, UI elements 202, 204, and 206 may represent components of one or more first executing user applications. The user may start up a second user application that includes UI element 210. The second user application may then obtain focus as depicted in UI element 210 being displayed at the depth perceived to be closest to the user. UI element 202, 204, and 206 can be pushed to a lower depth, which can be depicted by scaling the elements to a smaller scale and diffusing the intensity of shadows at lower depths. For example, the shadow 211a cast by UI element 210 on UI element 202 appears darker than the shadow 203 cast by UI element 202 on UI element 204 because of the relative depths of UI elements 202, 204, and 210. In this example, UI element 210 may also cast a shadow 211b on UI element 204, but at a different offset, shadow-casting angle, and/or intensity than the shadow cast on UI element 202 because of the differences in the depths of UI elements 210, 202, and 204. In particular, shadow 211b can be seen at a different offset and angle from shadow 211a, and shadow 211b is slightly darker than shadow 203. In some embodiments, the merger of shadows, can also cause the merged portion to appear more intense than it would otherwise if the shadows do not merge.

Figure 3A:
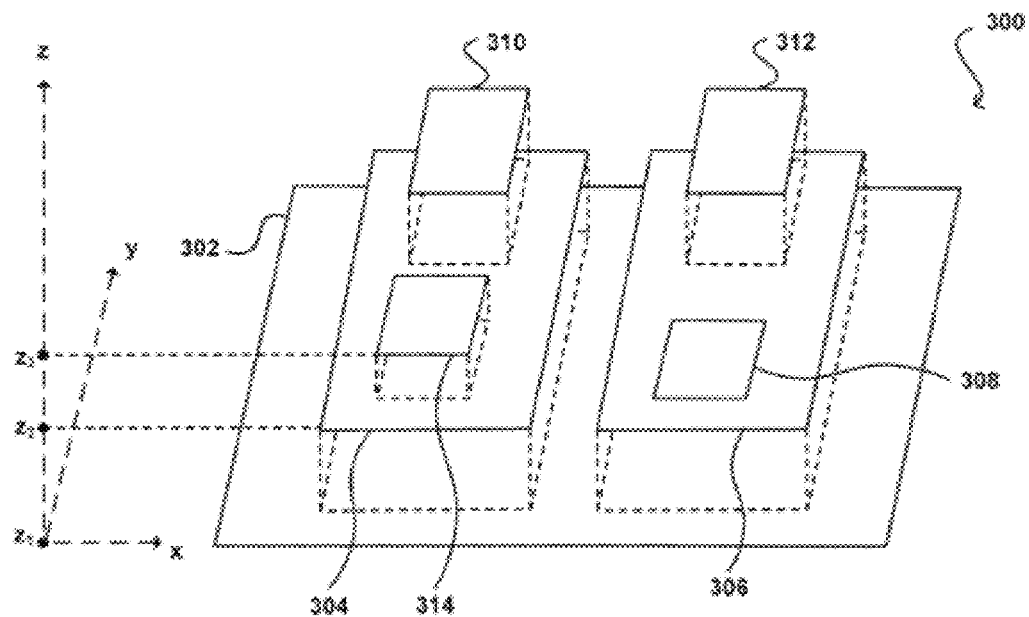

FIG. 3A illustrates an example 300 of a user interface displayed based upon a first viewing angle of a user in accordance with an embodiment. The example UI includes multiple user interface elements arranged at various depths. In particular, the UI elements are arranged according to three different depths, z0, z1, and z2. At the lowest depth z0 or the depth appearing to be furthest away from a user (and/or the display screen) is UI element 302. At the intermediate depth z1 are UI elements 304, 306, and 308. UI element 308 is contained within UI element 306. At the highest depth z2 or the depth appearing to be closest to a user (and/or the display screen) are UI elements 310, 312, and 314. In this example, UI elements 304 and 306 can be thought of as the "children" of UI element 302, UI elements 310 and 314 can be characterized as the children of UI element 304, and UI elements 308 and 312 are the children of UI element 306. UI elements 308, 310, 312, and 314 can be thought of as the "grandchildren" of UI element 302. Thus, UI elements 302, 304, 306, 308, 310, 312, and 314 can be represented as a UI hierarchy with UI element 302 as a root of the hierarchy, UI elements 304 and 306 as branches of the root, and UI elements 308, 310, 312, and 314 as leaves of the hierarchy, with UI elements 310 and 314 branching from UI element 304 and UI elements 308 and 312 branching from UI element 306. It will be appreciated by those of ordinary skill in the art that a user interface could have fewer or greater depths and/or fewer or greater UI elements than are illustrated in FIG. 3A. Thus, the depiction of the user interface 300 in FIG. 3A should be taken as being illustrative in nature and not limiting to the scope of the disclosure.

In various embodiments, each of the UI elements can be associated with presentation information such as a position and dimensions, including for example, x, y, and z coordinates defining an origin and a width and height for a planar UI element, x, y, and z coordinates defining the origin and a width, height, and depth for a rectangular cuboid UI element, or x, y, and z coordinates of vertices of a complex 3D UI element. It will be appreciated that UI elements can be represented as other primitive 2D or 3D geometric shapes, such as circles, triangles, polygons, spheres, pyramids, prisms, among others, or custom shapes defined by their vertices in other embodiments. The position and dimensions of each UI element can be used by a computing device to measure, layout, and/or draw the UI element based on the position of the face or head or user with respect to the computing device and/or the motion/orientation of the device to give the user an impression that he is interacting with the UI element in an environment having 3D depth. In addition, the position and dimensions of the UI element can be used to cast shadows based on an intersection of light from a virtual light source with the UI element to further enhance simulated 3D depth.

Figure 3B:
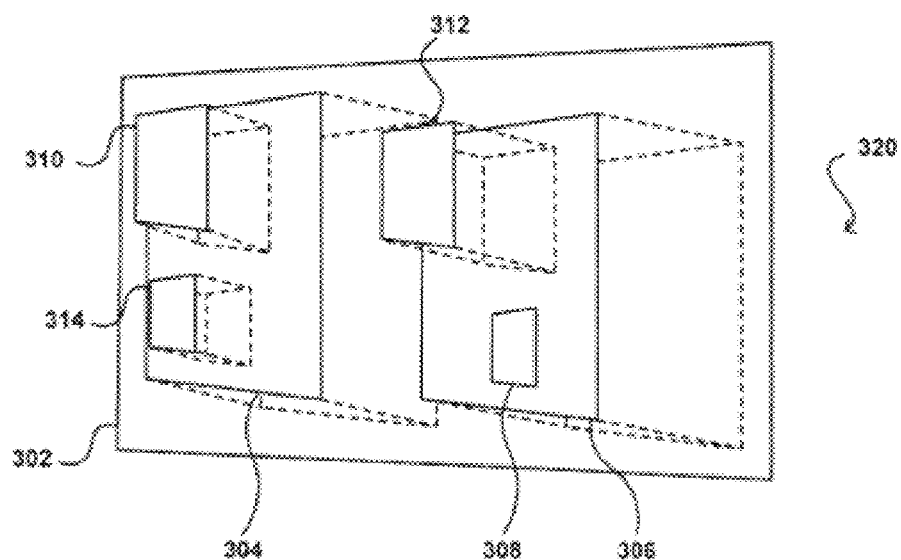

FIG. 3B illustrates an example 320 of the user interface at a second viewing angle of the user. In this example, the user has rotated the computing device laterally to the left (e.g., leftward along the y-axis). Such user interaction or input event may be monitored via an "event listener" associated with one or more of the UI elements. Upon detection of the input event, a callback function of the event listener may be invoked to cause the UI hierarchy to be redrawn or rendered to correspond to a new viewing angle of the user. In this example, UI elements 302, 304, 306, 308, 310, 312, and 314 can each be transformed according to a rotation, scale, translation, perspective projection, among other possibilities, based on the new viewing angle of the user so as to give the appearance that the UI elements exist in an environment having 3D depth. This can be demonstrated by the transformation of UI element 312, which can now be seen partially obscuring a portion of UI element 302 beneath UI element 304 which had not previously been obscured.

Figure 3C:
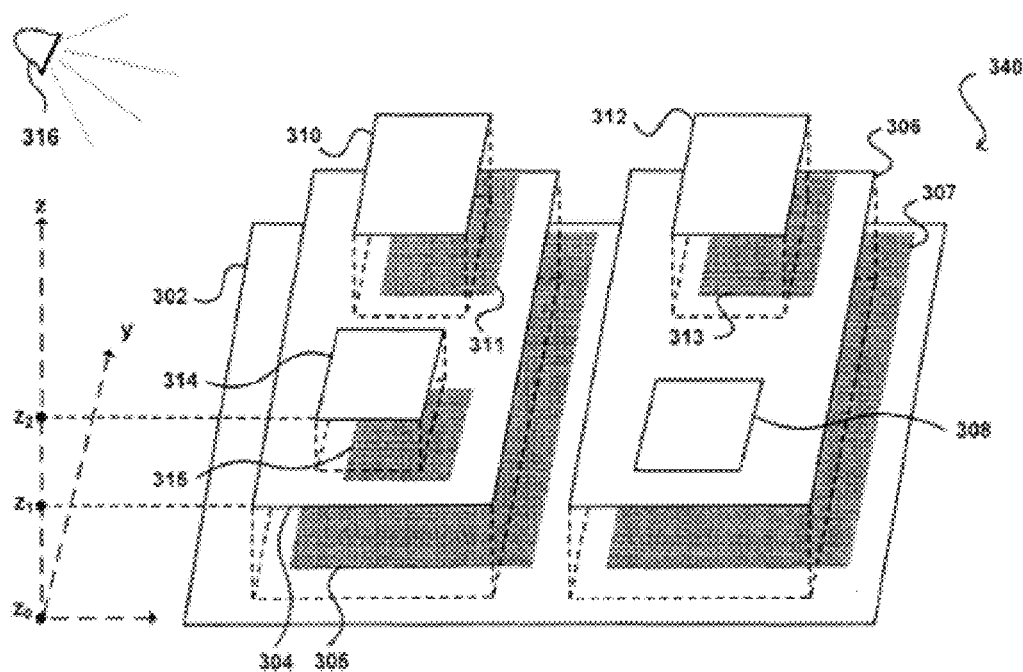

As mentioned, to further enhance an impression that a UI environment is associated with 3D depth, one or more UI elements can each be configured to cast a shadow based on the position and dimensions of the UI element, the properties of a virtual light source, and the position and dimensions of other UI elements upon which the shadow may be cast. FIG. 3C illustrates an example 340 of the user interface in which multiple UI elements have been configured to receive and/or cast shadows in accordance with an embodiment. In this example, a virtual light source 316 may be located off-screen at the upper left corner of a display screen presenting the UI. At the highest depth z3, UI elements 310 and 314 each cast a shadow 311 and 315, respectively, on their parent, UI element 304. Further, UI element 312 casts a shadow 313 on its parent, UI element 306. At the intermediate depth z2, UI element 308 does not cast a shadow on its parent because it is positioned flush (e.g., at the same depth) with respect to its parent, UI element 306. UI elements 304 and 306, however, each cast a shadow 305 and 307, respectively, on their parent, UI element 302. In this example, UI elements 302, 304, and 306 are shadow receivers as shadows are casted upon them by their children. UI elements 304, 306, 310, 312, and 314 are shadow casters as they cast shadows upon their parents. As can be seen with UI elements 304 and 306, a UI element can be both a shadow caster and a shadow receiver.

Figure 3D:
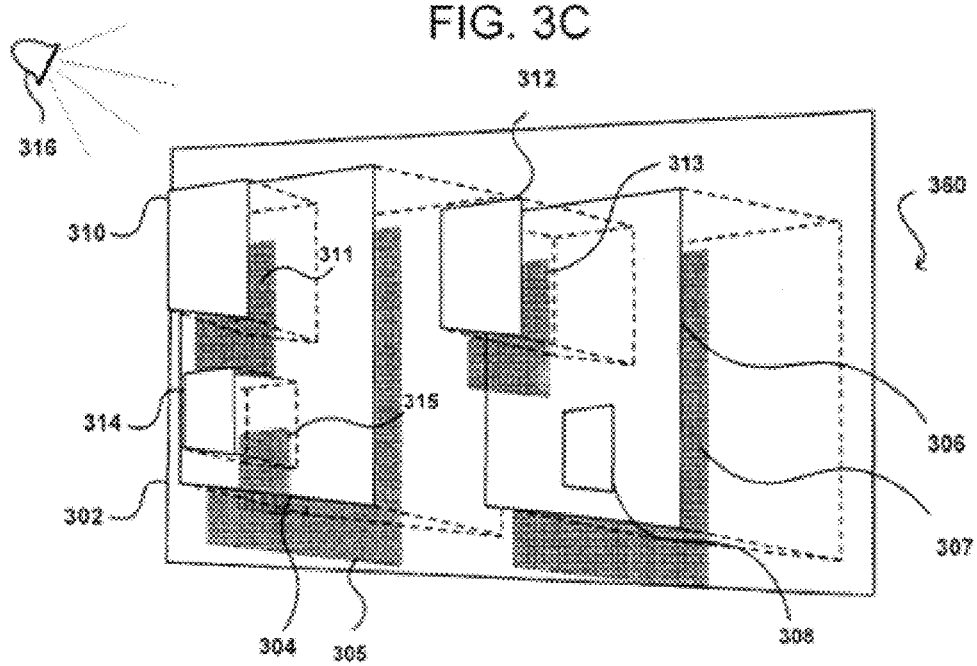

As the position of the user relative to the device and/or the motion/orientation of the device changes, transformations (e.g., rotation, scale, translation, perspective projection, etc.) can be applied to the UI elements to account for the new viewing angle of the user with respect to the device. Further, shadows can be redrawn or rendered according to the transformations of the UI elements and the properties of the virtual light source. FIG. 3D illustrates an example 360 of the user interface wherein the UI elements have been transformed based upon the new viewing angle of the user and shadows have been recast according to the dimensions of the transformed UI elements and the properties of the virtual light source. In this example, as the UI elements 302, 304, 306, 308, 310, 312, and 314 are transformed based upon the new viewing angle of the user, the respective shadows for shadow casting UI elements 304, 306, 310, 312, and 314 can also be redrawn or rendered to conform to the transformations of these elements' parents and/or the position and other characteristics of the virtual light source. The ability to recast shadows in a realistic manner can enhance the user's interactions with a user interface such as by providing cues as to how the user's behavior may affect the operation of a computing device.

FIG. 3E illustrates an example 380 of the user interface in which the depth of UI element 308 changes as a result of a user interacting with the UI or the UI otherwise receiving another input to change the state of the UI element. For example, the UI may be a product catalog displaying product information in a grid layout. UI element 308, as seen in FIG. 3A, may have initially been de-emphasized because there was no inventory for the product associated with UI element 308. In FIG. 3E, the inventory for the product associated with UI element 308 may be replenished. Further, there may be a sale for the product such that the depth of UI element 308 is elevated from depth z1 to a new depth z3. As mentioned, when there is a new 3D depth established within a UI framework, the UI framework may update state information with the new depth and the dimensions of the UI element positioned at the new depth. In this example, UI element 308 did not previously cast a shadow. However, in other situations where the depth of a UI element has changed and the UI element previously cast shadows, it will be appreciated that the previous shadows can be updated or removed based on the new depth of the UI element. Further, if the UI element previously received shadows, these shadows can also be updated or removed. After the shadows cast or received by the UI element have been updated or removed, the shadows cast and received by the UI element at the new depth can be determined. Here, as a result in the change in the depth of UI element 308, the UI element can be seen casting a shadow 309 on parent UI element. In this example, shadow 309 is offset further to the right than shadows 311, 313, and 315 because its corresponding shadow-caster, UI element 308, is positioned at a higher depth than the corresponding shadow-casters for shadows 311, 313, and 315, UI element 310, 312, and 314, respectively. In other embodiments, the angle of the shadows, intensity, among other parameters, can be used to convey relative depth information.

Figure 4A:
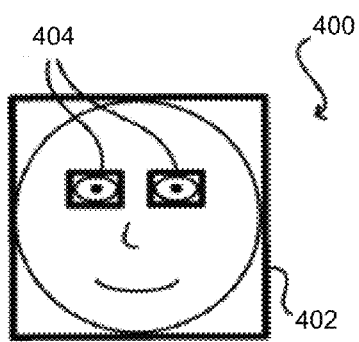
FIGS. 4A-4F illustrate example approaches to determining head position and/or gaze direction that can be used in accordance with various embodiments.

Various approaches can be utilized for locating one or more desired features of a user's face to determine various aspects useful for determining relative orientation. For example, an image can be analyzed to determine the approximate location and size of a user's head or face. FIG. 4A illustrates an example wherein the approximate position and area of a user's head or face 400 is determined and a virtual "box" 402 is placed around the face as an indication of position using one of a plurality of image analysis algorithms for making such a determination. Using one algorithm, a virtual "box" is placed around a user's face and the position and/or size of this box is continually updated and monitored in order to monitor relative user position. Similar algorithms can also be used to determine an approximate location and area 404 of each of the user's eyes (or in some cases the eyes in tandem). By determining the location of the user's eyes as well, advantages can be obtained as it can be more likely that the image determined to be the user's head actually includes the user's head, and it can be determined that the user is facing the device. Further, the relative movement of the user's eyes can be easier to detect than the overall movement of the user's head when performing motions such as nodding or shaking the head back and forth. Monitoring box size also helps to provide distance information as well as directional information, which can be helpful when generating a three-dimensional model for modifying image information based on relative user position.

Figure 4B:
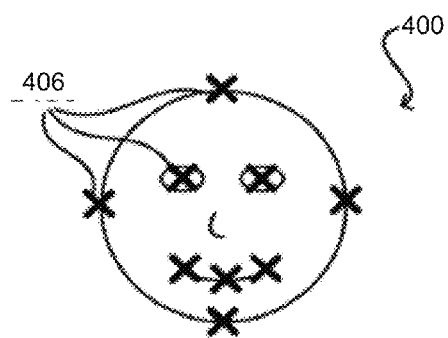

Various other algorithms can be used to determine the location of features on a user's face. For example, FIG. 4B illustrates an example wherein various features on a user's face are identified and assigned a point location 406 in the image. The system thus can detect various aspects of user features and can determine more subtle changes in orientation. Such an approach provides advantages over the general approach of FIG. 4A in certain situations, as various other features can be determined, in case the user's eyes cannot be seen due to glasses, hair, etc. In other embodiments, if certain particular features expected for a user's face (such as eyes or glasses, nose, mouth, etc.) cannot be seen, the system may determine that the user is looking away from the device.

Figure 4C:
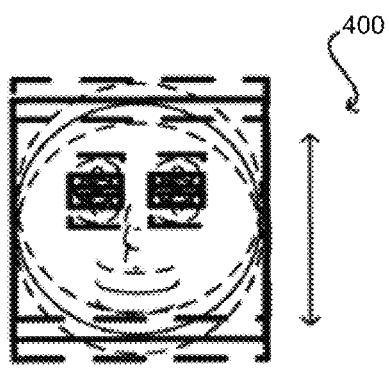
Figure 4D:
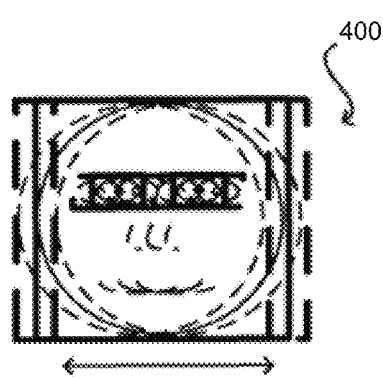
Figure 4E:
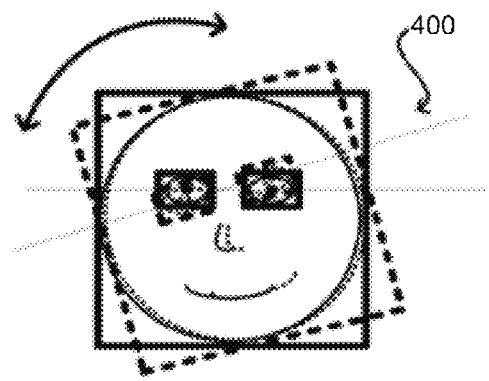
Figure 4F:
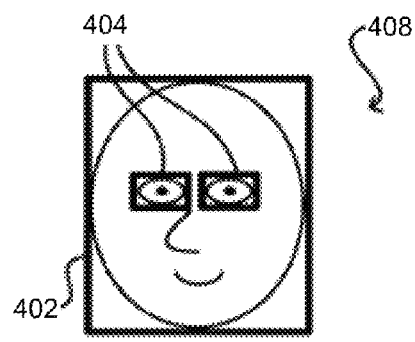

Once the positions of facial features of a user are identified, relative motion between the user and the device can be detected and utilized as input. For example, FIG. 4C illustrates an example where the user's head 400 is moving up and down with respect to the viewable area of the imaging element. As discussed, this could be the result of the user moving his or her head, or the user moving the device up and down, etc. FIG. 4D illustrates a similar example wherein the user is moving right to left relative to the device, through movement of the user, the device, or both. As can be seen, each movement can be tracked as a vertical or horizontal movement, respectively, and each can be treated differently as an input to modify a displayed image. As should be understood, such a process also can detect diagonal or other such movements. FIG. 4E further illustrates an example wherein the user tilts the device and/or the user's head, and the relative change in eye position is detected as a rotation. In some systems, a "line" that corresponds to the relative position of the eyes can be monitored, and a shift in angle of this line can be compared to an angle threshold to determine when the rotation should be interpreted as input. FIG. 4F illustrates another advantage of using an approach such as that described with respect to FIG. 4B to determine the position of various features on a user's face. In this exaggerated example, it can be seen that the features of a second user's head 408 have a different relative position and separation. Thus, the device also can not only determine positions of features for a user, but can distinguish between different users.

Figure 5A:
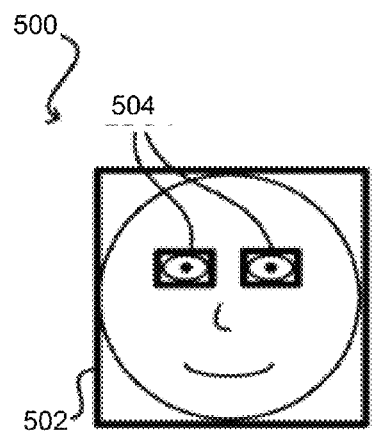
FIGS. 5A-5B illustrate example approaches to determining changes in the relative distance to a user in accordance with various embodiments.
Figure 5B:
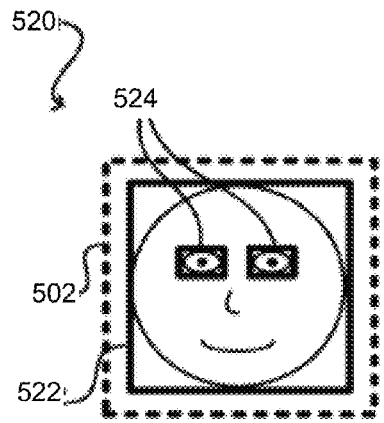

FIGS. 5A and 5B illustrate an example approach that can be used to determine variations in relative distance between a user and a device that can be used in accordance with various embodiments. As in FIG. 5A, the approximate position and area of a user's head or face 500 is determined and a virtual "box" 502 is placed around the face at an initial distance as an indication of distance using one of a plurality of image analysis algorithms for making such a determination. If the user is known, the size of the user's head might be stored such that an actual distance to the user can be calculated based at least in part upon the size of the box 502. If the user is not known, the distance can be estimated or determined using other factors, such as stereoscopic imaging. In some embodiments, determinations will be relative with respect to an initial box size when the actual distance cannot be determined.

As the distance between the user and the device changes, the size of the virtual box will change as well. For example, in FIG. 5B the distance between the user and the device has increased, such that the user's head 520 appears smaller in the captured image information. Accordingly, the size of the virtual box 522 for the adjusted size of the user's head is smaller than the original box 502 for the initial distance. By monitoring adjustments in the size of the box or another measure of the user's head and/or other such features (e.g., boxes 524), the device can determine an approximate distance and/or change in distance to the user. As discussed, this information can be used to adjust aspects of the displayed image information such as a level of zoom or amount of detail.

FIGS. 6A to 6D illustrate an example of how an interface plane or element at different depths can be used to generate viewing-angle appropriate images in accordance with at least some embodiments. In FIG. 6A, the example orientation 600 has a user 602 substantially in front of a display element 604 of a device. For simplicity of explanation, the interface plane or element here is represented in three dimensions, with a box 606 on a background 608. At the current viewing angle, the user is only able to see the top surface 610 of the interface plane or element 606, as illustrated in the display view 620 of FIG. 6B. In the orientation 640 of FIG. 6C, the device has been rotated (or the user has moved with respect to the device). To provide an appropriate user experience in at least some embodiments, the interface plane or element is effectively rotated with the device, such that the interface plane or element and background 608 would rotate accordingly. Based on the current viewing direction of the user 602, it can be seen in the display view 660 of FIG. 6D that the viewable portion 662 of the interface plane or element includes not only the top of the interface plane or element but at a level of depth (i.e., the interface plane appears to be closer to a display screen of the device). By calculating this angle, the application can determine the portions of the top and side of the interface plane or element to display as a result of the rotation. It also can be seen in FIG. 6C that any area occluded by the right side of the interface plane or element in FIG. 6A now can be seen, and that the area occluded by the left side of the box is interface plane or element greater in FIG. 6C.

Figure 7A:
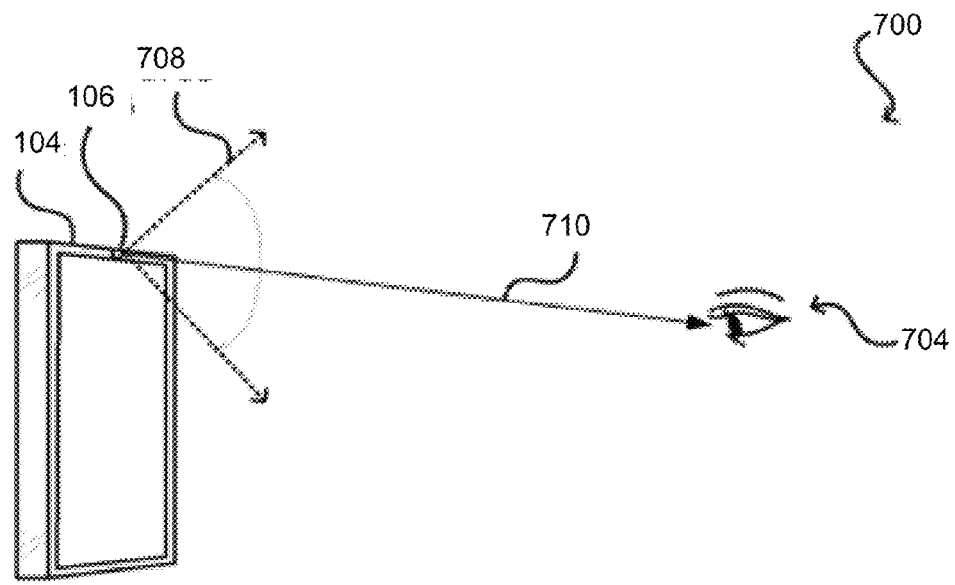
FIGS. 7A-7B illustrate an example approach to determining the relative position of a user that can be utilized in accordance with various embodiments.

In at least some embodiments, a computing device can utilize one or more cameras or other such sensors to determine the relative direction of the user. For example, FIG. 7A illustrates an example situation 700 wherein a computing device 104 is configured to utilize at least one camera element 106 to attempt to locate a feature of a user, such as the user's head or eyes, for purposes of point of view determination. In this example, the user's eyes 704 are located within the field of view 708 of a camera of the computing device 104. As discussed elsewhere herein, however, the point of view of a user can be determined using positions of the user's eyes, pupils, head, or other such features that can be indicative of at least a general point of view. In some embodiments, the device might look for an object held by or otherwise associated with a user to determine a general point of view for rendering. Further, in some embodiments a device might utilize at least two different cameras positioned on the device with a sufficient separation such that the device can utilize stereoscopic imaging (or anther such approach) to determine a relative position of one or more features, with respect to the device, in three dimensions. It should be understood that there can be additional imaging elements of the same or a different type at various other locations on the device as well within the scope of the various embodiments.

Software executing on the computing device (or otherwise in communication with the computing device) can obtain information such as the angular field of view of the camera, the zoom level at which the information is currently being captured, and any other such relevant information, which can enable the software to determine an approximate direction 710 of at least one of the user's eyes with respect to the camera. In many embodiments, direction information will be sufficient to provide adequate point-of-view dependent rendering. In at least some embodiments, however, it can also be desirable to determine distance to the user in order to provide a more consistent and accurate rendering. In some embodiments, methods such as ultrasonic detection, feature size analysis, luminance analysis through active illumination, or other such distance measurement approaches can be used to assist with position determination. In other embodiments, a second camera can be used to enable distance determinations through stereoscopic imaging. Once the direction vectors from at least two image capture elements are determined for a given feature, the intersection point of those vectors can be determined, which corresponds to the approximate relative position in three dimensions of the respective feature as known for disparity mapping and other such processes.

Figure 7B:
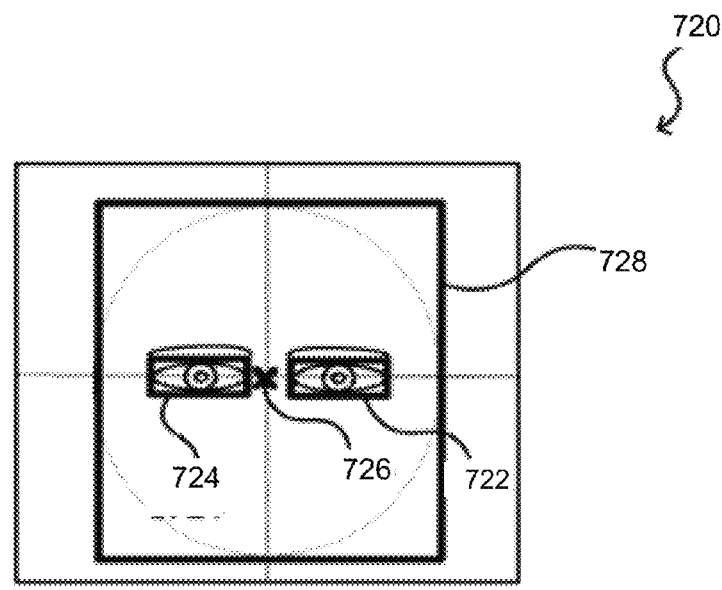

Further illustrating such an example approach, FIG. 7B illustrates an example image 720 that could be captured of the user's head and eyes using the camera 106 of FIG. 7A. One or more image analysis algorithms can be used to analyze the image to perform pattern recognition, shape recognition, or another such process to identify a feature of interest, such as the user's eyes. Approaches to identifying a feature in an image, such may include feature detection, facial feature extraction, feature recognition, stereo vision sensing, character recognition, attribute estimation, or radial basis function (RBF) analysis approaches, are well known in the art and will not be discussed herein in detail. As illustrated in this example, both eyes of the user might be able to be located in the captured image information. At least some algorithms are able to determine an approximate location or region 722, 724 for each eye, or at least an approximate location 728 of the user's head, where at least one of those locations or regions is used for point of view determinations. Depending on factors such as the desired level of sensitivity and distance between the user and the device, however, such information can impact the accuracy of the point of view determinations. Approaches in accordance with various embodiments can take advantage of the fact that the human brain combines and processes information from both eyes to provide a "single" point of view. Thus, the software can attempt to determine an intermediate point 726 between the user's eyes to use for the user's point of view. Various other approaches can be used as well, such as are discussed elsewhere herein. Once a relative location is determined in the image information, the device can use information such as the field of view of the camera, the position of the camera with respect to the device, the zoom level of the camera, and other such information to determine a relative direction of the user, with that relative direction being used for the point of view to use in rendering the interface.

When using a camera to track location, however, the accuracy is limited at least in part by the frame rate of the camera. Further, images take some time to process such that there can be some lag in the determinations. As changes in orientation of the device can occur relatively quickly, it can be desirable in at least some embodiments to enhance the accuracy of the point of view determinations. In some embodiments, a sensor or other such element (or combination thereof) of a computing device can be used to determine motion and/or orientation of the computing device, which can help adjust point of view determinations. The sensors may be any appropriate motion sensor(s) capable of providing information about rotations and/or translations of the device, as may include accelerometers, inertial sensors, electronic gyroscopes, electronic compasses, magnetometers, and the like. The device can be configured to monitor for a change in position and/or orientation of the device using these motion sensor(s).

Upon detecting a change in position and/orientation of the device exceeding a specified threshold, the UI elements presented on the device can be redrawn or rendered to correspond to the new position and/or orientation of the device to simulate 3D depth. In other embodiments, input data captured by the motion and/or orientation determination components can be analyzed in combination with images captured by one or more cameras of the device to determine the user's position with respect to the device or related information, such as the user's viewing angle with respect to the device. Such an approach may be more efficient and/or accurate than using methods based on either image analysis or motion/orientation sensors alone.

Figure 8:
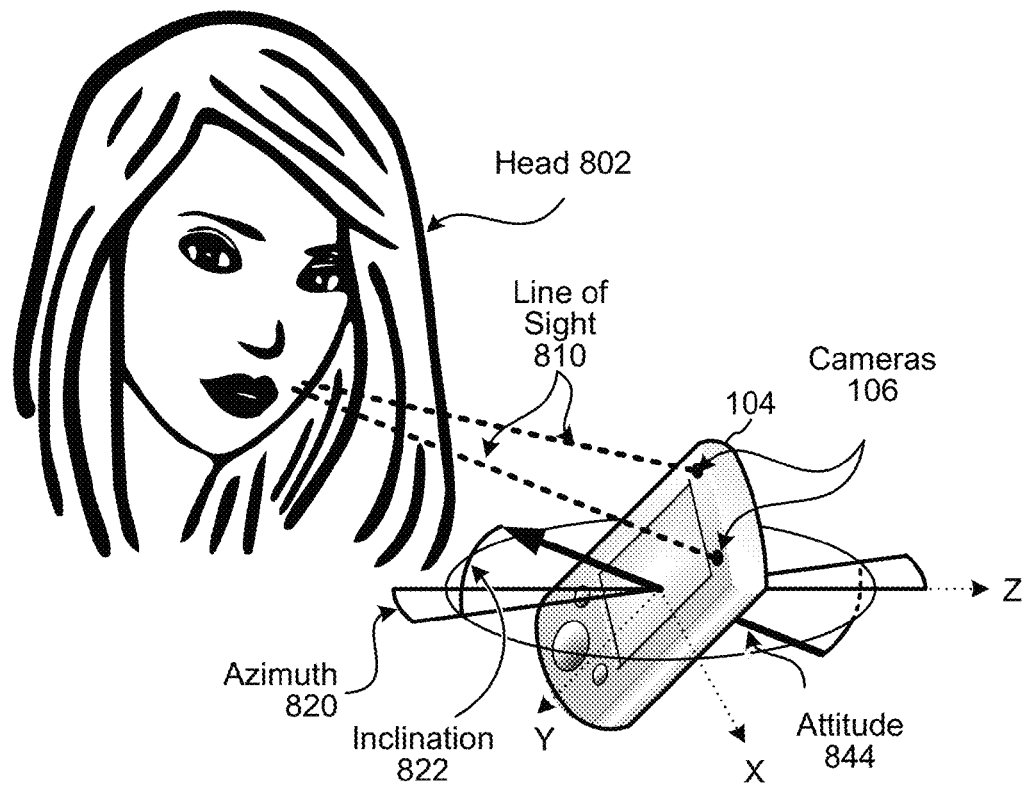
FIG. 8 illustrates using motion sensors with image processing to compute movement of a device in accordance with various embodiments.

FIG. 8 illustrates the use of the camera(s) 106 to determine orientation of the device 104 relative to a face/head 802 of a user while motion sensors may detect orientation/movement of the device 104. The position of the user/head may be determined based on the distance from the user to the device as well as based on the angle of the user/head relative to the device using camera(s) 106 and line of sight 810 using techniques described above. The device 104 may then render the UI based on the position of the user's face/head, for example using a projection matrix to render UI features as if the user's head is a camera projecting the UI. When a position of the user's head is established, certain changes to the head position may be detected using the motion sensors of the device, which provide output with lower latency that that of a head tracking system described above. The motion sensors of the device 104 may be used to track changes in device movement relative to an XYZ coordinate system (such as that illustrated in FIG. 8), relative to an angular position, such as an orientation measured in azimuth 820, inclination 822, or attitude, 824, or relative to some other measurement system. With a priori knowledge of the head position (as calculated by a camera based head tracking system) before a specific device movement, the device 104 may measure a change in orientation/position as measured by motion sensor(s) to compute an expected post-movement head position. The UI may then be rendered based on this expected post-movement head position.

Figure 9A:
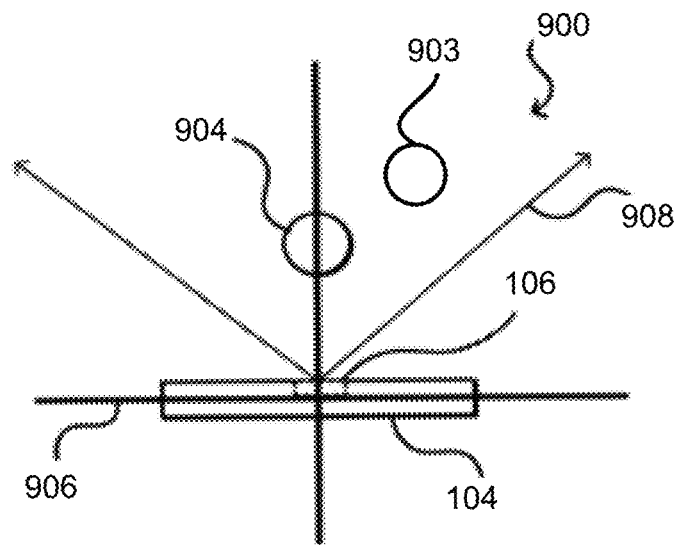
FIGS. 9A-9B illustrate an example approach to determining device motion that can be utilized in accordance with various embodiments.

For example, FIG. 9A illustrates a "top view" 900 of a computing device 104 operable to capture an image of an object 904 (e.g., a user's head) within an angular view 908 of a camera 106 of the computing device. Although another head, 903, is also within view of the computing device 104, using the techniques described in the present disclosure, the computing device 104 tracks head 904. In this example, the computing device 104 includes at least one orientation- or rotation-determining element, such as an electronic compass or electronic gyroscope, that is able to determine a frame of reference 906 in two or three dimensions with respect to a first orientation of the device. In at least some embodiments, an electronic compass might be used to determine an axis of the frame of reference 906, as may correspond to a North direction, etc. In other embodiments, a component such as an electronic gyroscope might be calibrated periodically with a component such as a compass, but might instead determine changes in orientation along three axes of rotation over time. Various other approaches to determining changes in orientation along one, two, or three axes of rotation can be used as well within the scope of the various embodiments.

A first frame of reference 906 or orientation can be determined at or near the time of capture of a first image by a camera 106 of the computing device 104. In some embodiments, the determination can be triggered by receiving input to capture an image or another such action, but in other embodiments the frame of reference and/or orientation information can be updated periodically, such as several times a second based upon the type and/or configuration of the electronic gyroscope. The gyroscope can also be any appropriate electronic gyroscope component, such as a conventional MEMS gyroscope used in various consumer devices. Approaches for implementing and obtaining orientation changes from such a gyroscope are well known in the art and, as such, will not be discussed in detail herein.

Figure 9B:
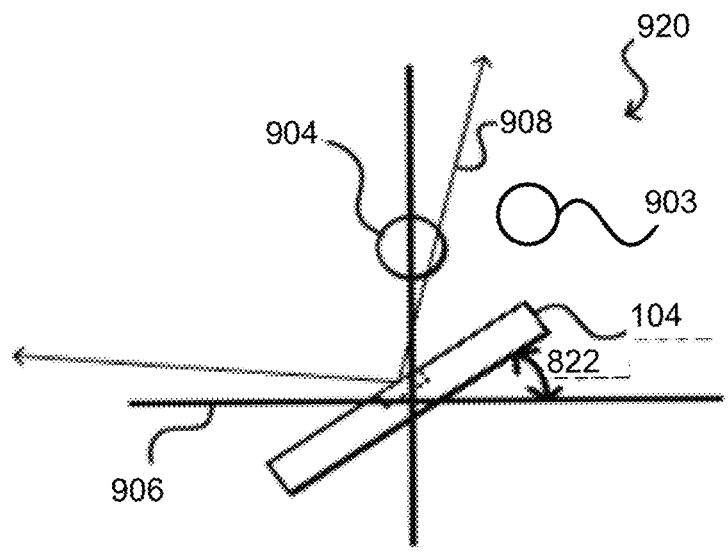

FIG. 9B illustrates a second top view 920 after a change in orientation of the computing device 104. The electronic gyroscope (or other such component or embedded sensor) can detect the change in orientation, in this example corresponding to a change in angle 912 with respect to the frame of reference in the plane of the figure. The gyroscope can present information about the change in orientation in any appropriate form, such as in angles or radians of change for one, two, or three degrees (e.g., $\Delta x$, $\Delta y$, $\Delta z$), percentage changes in pitch, roll, and yaw, etc. In this example, the change in orientation is determined to be a given angular amount of rotation 912 about a single axis. As illustrated, this causes the object 904 to be moved to the right edge of the field of view 908 of the camera 106. In at least some embodiments, the gyroscope may not be accurate enough to provide an exact amount of rotation, but can provide an approximation or estimate of the amount of rotation that can be used to narrow the search space and facilitate the location of corresponding objects in the images. Further, the information can provide a faster adjustment or prediction of relative position than can be provided from the camera in at least some embodiments. A similar approach can be used for translation, although the effects of translation on objects in captured images can be much less significant than angular changes, such that the image information might be sufficient to account for translation changes in at least some embodiments.

When multiple faces or individuals are detected proximate to a display of the device (i.e., in front of the display) the device may select one face as being the face of a primary user (that is, the user holding the device). This may be done by the device detecting and associating one or more physiological conditions with the detected individuals. The device may then detect and associate one or more physiological features with the user holding the device. The device may then compare the physiological features to determine which face belongs to the user holding the device. Thus, to establish the primary user of the device, a comparison of physiological indicators may be made from two different inputs. For example, detecting the pulse of one or more individuals seen by the cameras and comparing those with a pulse of a user holding the device, which is determined using motion sensors (or other sensors) of the device.

As used herein a physiological condition is a condition or state of the body or bodily functions. Examples of physiological conditions include heart rate/pulse, sinus rhythm, breathing/respiratory rate, pupil dilation, blood flow to certain parts of the body, temperature, etc. Physiological conditions may be detected using various sensors/techniques. The examples below illustrate user matching based on blood flow to the face, but other physiological conditions may also be used. In certain embodiments, the physiological condition may be one that is detectable by cameras of a device (such as detecting blood flow through color changes, breathing rate through expansion of a chest and/or nostrils, etc.) as well as one that is detectable by other sensors of the device (such as detecting a pulse through a heart rate monitor, detecting a heart rate through certain vibrations of a device, detecting breathing noises through a microphone, etc.). Thus an indication (i.e., data) of a physiological condition detected through one method (such as cameras) may be compared to an indication of a physiological condition detected through another method (such as physiological sensors). The physiological condition detected by the methods may be the same or may be different.

A physiological sensors may include any sensor capable of providing data relating to a physiological condition of an individual. For example, as discussed below in FIG. 11, a physiological sensor may be a biometric sensor, such as a heart rate detector 1163, temperature sensor 1165, etc. that directly measures a physiological condition of an individual. The physiological sensor may also include a sensor that measures different data that can be used to determine physiological data of an individual. For example, data from motion sensor(s) of a device, if sufficiently precise, may be processed to identify the pulse of an individual holding the device by analyzing, for example, the frequency of particular movements of the device. Thus, physiological sensors may also include other sensors if the data from the other sensors may indicate an individual's physiological condition.

Methods for detecting a pulse using different methods are described below. In certain embodiments, determining the human pulse or heartbeat can include determining the location of an individual's head in the captured video can be determined, and color values of a portion of the video corresponding to the head can be analyzed for variations corresponding to the fluctuations in a human face for a human pulse. For example, the red values of a human face can vary with the pulse cycles as the amount of blood flow varies. While this variation may be too subtle to be noticed by the human eye, a video camera of a computing device can be sensitive enough to detect the variations. These variations then can be used to verify that captured image information reflects an actual person, and not a generated or obtained image of a person. Other fluctuations in the video information can be determined as well, such as the blinking of an individual's eyes, dilation of an individual's pupils, rotation of an individual's head, and other such information.

For example, color (when available) is another cue that can be used to assist with face detection. Color histograms in general are representative of image color. A histogram can indicate the number of observations that fall into each of a number of disjoint categories or "bins." The appropriate bins to use in at least some embodiments can be determined during a training phase, wherein appropriate color ranges or values can be selected that are indicative of faces or other such features. Different numbers of bins can be appropriate for different training sets, and different bin sizes can reveal different features of the data. In addition to color, intensity histograms are a distinctive way of separating an object in an image from the background in the image. Both color and intensity histograms can be made stronger by computing them in different image sub-regions and then accumulating all histograms into one. These cues can be combined with other cues using the normalization procedure described above.

Figure 10A:
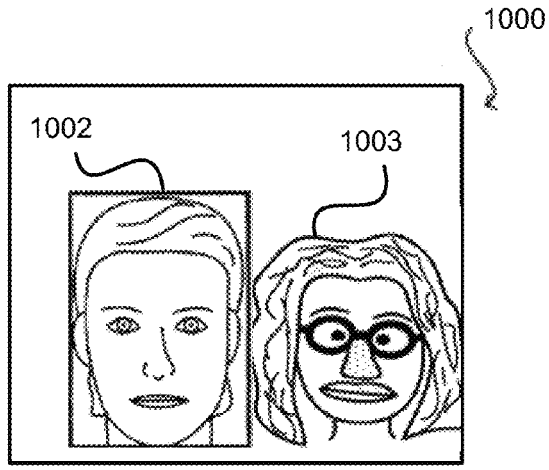
FIGS. 10A-10D illustrate stages of an image being analyzed to detect changes in chroma values in accordance with various embodiments.
Figure 10B:
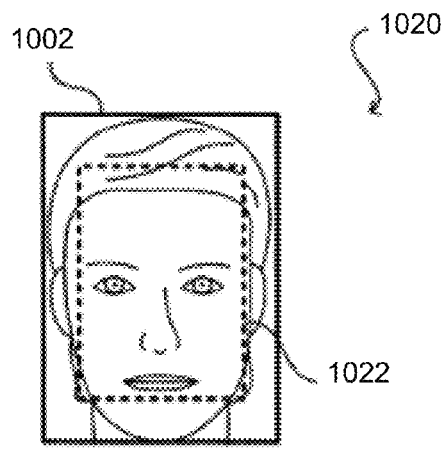

In various embodiments, a human pulse or heartbeat can be determined. Determining the human pulse or heartbeat can include capturing video information and/or a series of images over a period of time sufficient to determine one or more cycles of a human pulse. In at least some embodiments, the video or image capture can occur during the performance of the facial recognition process on an initial image or video frame, etc. As illustrated in FIG. 10A, at least some embodiments also utilize a face or head detection algorithm as discussed above to attempt to locate an approximate head or face position 1002 in a captured image or video frame 1000. As shown in FIG. 10A, a user's head 1002 is shown next to another head 1003. The other head 1003 may belong to another individual or may be a head-like image that appears near the actual user (for example a face that appears on a picture visible in the image frame 1000. In another example, the face 1003 may be some other face, such as a face of a costumed character, mascot, etc. As discussed herein, the system may perform the following processing to match physiological conditions of the user's face and the alternate face 1003 to identify the location of the user's face. In approaches that attempt to detect color variations in the person's face, it can improve results in at least some embodiments to sufficiently isolate the person's face, such that variations in the background of the image do not create false positives (or false negatives in some instances). As illustrated in the isolated image portion 1020 of FIG. 10B, in some embodiments an algorithm can analyze only a central portion or region 1022 of the determined head position 1002, in order to attempt to include primarily facial area and not hair or areas just outside the face region due to differences between the actual shape of the user's face and the shape of the bounding box 1002 or other such boundary.

Figure 10C:
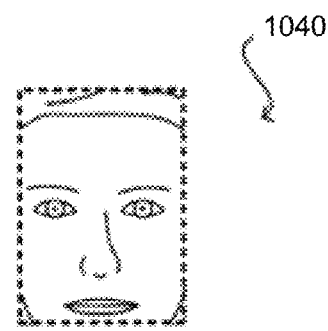
Figure 10D:
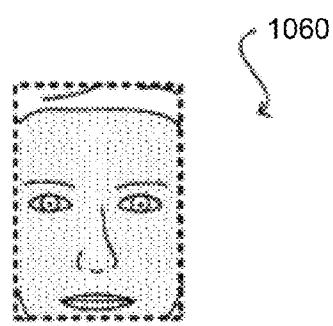

Once the facial region to be analyzed is determined, and tracked or updated over time in the video information, one or more color analysis algorithms can attempt to detect certain variations in that region over time. For example, the image portions 1040, 1060 of FIGS. 10C and 10D, respectively, show (with an exaggerated difference) that there can be variations in the color of a person's face over time, due to changes in blood flow corresponding to the human pulse, which can be detected by a camera of the computing device. In this particular example, the changes will primarily be detected in a red channel, such as in the chroma (color purity), intensity, or saturation of red colors in the image portions. It should be understood, however, that variations can similarly be detected in other color channels or portion as well. For example, as blood is pushed through the human face as a result of a pulse or heartbeat, the face will appear slightly redder. During other periods, the face will appear somewhat less red. By monitoring for changes in color corresponding in time to a period of a human pulse, and in amount of variance to that of human skin, a determination can be made as to the pulse of an individual seen by a camera of the device. This determination of pulse may be performed for one or more individuals seen by the device's camera(s).

Figure 10E:
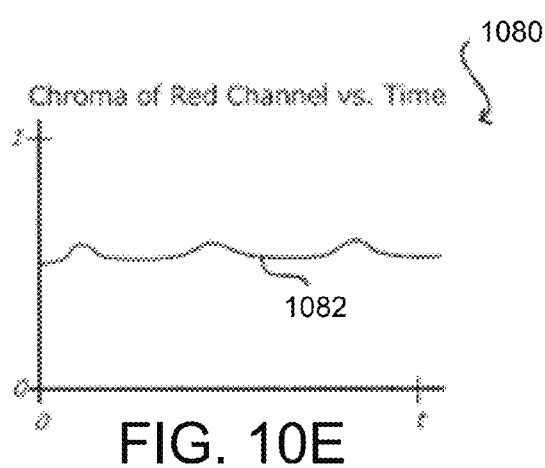
FIG. 10E illustrates an example plot of intensity values over time for a red chroma channel that can be generated in accordance with various embodiments.

FIG. 10E illustrates an example plot 1080 of the chroma value for a red channel of an image over time. In this example, the facial region of the image can be determined and the colors separated into appropriate channels or components (e.g., red, blue, and green). The red values can be analyzed over time, and factors such as the chroma (or intensity, saturation, or other such measure) analyzed to determine whether the values 1082 vary in time corresponding to the period of a human pulse, and vary in value or amplitude within a range appropriate for human skin. In the example plot, the red values vary periodically at a rate within the range of a human pulse, and with an appropriate amount of change, such that the device can determine that the face being imaged is likely an actual human face. "Chroma" as used herein refers to the perceived "strength" of a color and is well understood in the art to represent a degree of visual difference from a neutral gray of the same brightness, or the amount of color of an image relative to the brightness of an image of a white object similarly illuminated. In an embodiment, the red color signal, or the difference between the red and blue color signals (R−B) is divided by the sum of the color signals (R+G+B) which may also be available as the luminance signal (brightness independent of chroma). In this way, a color signal (R−B)/L is sensitive to the variations in chroma due to the pulse but insensitive to variations in overall illumination. This in known in the art as normalization.

The chroma value for the red channel can be tracked over a period of time, such as at least one cycle of a typical human pulse. The changes in chroma value tracked over time and can be analyzed to determine the pulse/heartbeat. In addition to tracking skin-color change of a detected face, other techniques such as thermal detection (including thermal imaging), ultrasonic detection, etc. may be used to determine physiological changes in a detected face.

In some embodiments, a heartbeat can be considered to be on the order of about one beat per second. If a video camera captures information at a rate of at least 15-30 frames per second, as is typical for even low quality conventional video cameras, the number of data points will be more than adequate to determine variations due to heart rate. Further, a couple seconds of video should be sufficient to capture at least two full cycles of information, which can be sufficient to determine rate in addition to amount of variation. The frequency at which the red colors change can be used to determine the use's approximate heartbeat, and the frequency must be within a determined range of potential heart beats in order for the user to be authenticated as an actual person. To filter out color changes that may not correspond to a pulse, a filter such as a band pass filter may be used to isolate color changes that have a frequency that generally corresponds to the possible range of frequencies of a human pulse.

In at least some embodiments, the captured video does not need to be buffered any longer than is needed for color analysis. For example, a chroma triplet (e.g., R, G, B) of values can be determined for the region of interest in each frame, and that information stored for subsequent analysis, such as may use the plotting of FIG. 10E. Such an approach can result in a relatively small data set to be analyzed after the determined period of time for monitoring pulse. Further, as long as a facial region can be determined with a reasonable degree of certainty, the video camera can operate in a relatively low resolution mode, as only enough information is needed to detect a change in color values over time.

In addition to processes discussed herein, other approaches to utilizing photoplethysmography (PPG) can be used to detect a cardiovascular blood volume pulse through changes in the light reflected (or transmitted) from a person's skin. Pulse measurements can be made using images of the human face illuminated with ambient light, or another such source. The detected light can be analyzed along any appropriate channels using any appropriate color sensors, such as may include red, blue, and green among others. The observed weights of the color information from each channel can be measured over time to determine changes due to the facial blood vessels over the cardiac cycle. In some embodiments the color values can be spatially averaged over all pixel values in the analyzed region. One or more filters can be used to process the color signals as well as known for such purposes. In one embodiment, the red channel is ratioed with the blue and/or green channels (R/(B+G), R/B, or R/G) so that the signal analyzed for pulse detection is normalized for ambient light conditions even if ambient light conditions are changing and the modulation of the signal is maximized. In another embodiment, the red channel is ratioed with the luminance of the signal R/L where luminance is understood in the art to the brightness of the image independent of color information and is equivalent to R/(R+G+B). Said luminance value is often generally available and this ratio R/L may be slightly easier to obtain than the aforementioned R/(G+B) and will suffer only slightly less modulation strength but may provide a better normalization against difficult ambient lighting situations. All of these methods whereby the red component is measured relative to the other components or to the overall brightness will be referred to as normalized red chroma.

Techniques such as color amplification and motion amplification may also be used on the camera data to detect blood flow or other physiological conditions. Such amplification techniques involve isolating sections of video data (such as pixels) where changes are detected (for example, changes in color of an object or in movement of the object). Those changes may then be amplified to exaggerate the changes, resulting in output making it easier to notice changes in condition of an object. Color amplification and motion amplification may thus ease detection of a physiological condition in a face detected by a camera of a device.

The techniques described here may be performed for multiple faces detected by a camera, for example for both head 1002 and head 1003 shown in image frame 1000 of FIG. 10A. The physiological conditions for each face measured by the camera system may then be compared to the physiological conditions measured by other sensors to identify the user of the device. The physiological detection using the cameras may also be used to identify when a detected face is of a living individual. For example, if user 1002 is standing next to a poster showing face 1003 (or next to a costumed character, mascot, etc.), the system may detect no physiological chances in face 1003 and may thus indicate that face 1003 does not belong to a living individual. Similarly, if face 1003 was detected on a user's shirt, on a cup that the user was drinking from, etc., the system would be able to determine that face 1003 did not belong to the user and thus ignore face 1003. The face that is determined to match the data from the physiological sensors may be selected for head tracking and UI rendering. Other face(s) may be ignored for head tracking/UI rendering, that is the system may render track the user's face and render the UI without regard to other detected face(s).

To match a pulse (or other physiological condition) of face shown in an image to the user of the device, pulse (or other physiological condition) information may be obtained from another source. Most simply, the device may be equipped with a sensor that may detect the pulse (or other physiological condition) for purposes of comparison. For example, a device may be configured with a heart rate monitor or other component that detects the heart rate (for example through electrical impulses) of a user holding a device. The output of such a sensor may be used to detect a pulse. In another example, the handheld device may be associated another device (for example a wearable device such as a bracelet, ring, watch, etc.) that is communicatively connected (for example, through Bluetooth or the like) with the handheld device. Both the handheld device and wearable device may be considered part of the system. The wearable device may include a sensor that can be used to determine the physiological condition of a user. That physiological condition may become the comparison point with which to identify which face is the primary user.

In one embodiment, the comparison physiological condition may also be a pulse rate detected using a camera, however this pulse rate may be one known to be associated with the user of the device. For example, the above chroma and other camera-based pulse detection techniques may be performed on a user's finger placed in contact with the device, only over a camera of the device. As the finger is in contact with the device in this example, the device may presume that the finger belongs to the user of the device. Thus, the pulse rate of the finger detected using the output of the camera may be compared to the pulse rates of the faces detected using the output of the other cameras of the device to determine which face corresponds to the user holding the device.

In another embodiment, other sensors may be used to determine a physiological condition. Motion sensor(s) such as a gyroscope, accelerometer, etc. may detect vibration of the device. A user holding the device may unconsciously vibrate or shake the device at a frequency corresponding to the user's heartbeat. Output from the motion sensor(s) may be filtered to isolate a vibration in a frequency corresponding to a heartbeat. For example, a consistent power level of movement may be seen in a frequency band corresponding to the heartbeat. That frequency may be used to determine a pulse of the user holding the device. That pulse may then be compared to pulses detected in the faces to find out which face has the same pulse as the user holding the device. Similar techniques may apply to detecting the user based on sinus rhythms. If the device is equipped with particularly sensitive motion sensor(s), the movement data output by the motion sensors(s) (along with possibly data from other sensors such as a microphone, etc.) may be accurate/precise enough to determine which muscles a user has moved to operate the device using myographic techniques. Data from one or more such physiological sensors that are linked to the device (such as physically incorporated with the device or communicatively connected to the device) may be matched to camera data, which may show a certain individual among those shown, moving the corresponding muscles, thus identifying that individual as the primary user.

If a number of pulses are detected using the camera(s) and a pulse is detected using the physiological sensor(s) a comparison is made to determine which of the camera detected pulses most closely matches the motion sensor detected pulse. For example, if three individuals are detected by the cameras as having pulses of 75, 69, and 62 beats per minute respectively, and the physiological sensor determines that the user holding the device has a pulse of 60 beats per minute, the face associated with the pulse rate of 62 may be determined to belong to the primary user of the device. In certain embodiments the device may configure a similarity threshold, within a certain number (e.g., five) of beats per minute. If a pulse detected by the camera is within the similarity threshold to a pulse detected by the physiological sensors, they are considered to be a match.

If multiple pulses are detected by the cameras that are potential matches for the pulse detected by the physiological sensors, the system may attempt to determine which face pulse most closely matches the pulse detected by the physiological sensors. This may include, for example, attempting to match the pulse's phase (i.e., at what time the heart actually beats) between the two data sets. That is, the system may determine based on the camera data that an individual experienced a heartbeat at a particular time. The system may also determine based on the physiological sensors that the user holding the device experienced a heartbeat at a particular time. The system may determine if the timing of the heartbeats of any individuals detected by the cameras align with the timing of the heartbeat of the user holding the device. Due to latency concerns, however, the different data may not align well. Thus the system may timestamp the camera data, physiological sensor data, etc. for purposes of aligning the data and attempting match the phase of the pulse (or otherwise match the timing of detected physiological conditions).

The process of detecting a primary users may be initiated when the UI attempts to render based on a position of a user. If multiple faces are acquired, the system may attempt to identify the primary user based on a physiological condition detected by the cameras and by other sensors of the device. The process may also occur when the device detects a "scene change," that is when the scene detected by the cameras changes significantly enough. In one example, if the system detects a scene change corresponding to a new face being detected by a camera, such as a new face attempting to look at a device, and that face is determined not to correspond to the user of the device, the device may implement a privacy mode of a user interface, and render and display the UI based on the position of the user in a manner to prevent or obscure the display from the unauthorized viewer.

FIG. 11 illustrates a block diagram conceptually illustrating components of a system 100 to perform the steps described herein. Depending upon how the system is structured, some of components shown in FIG. 11 as part of a device 104 may be included in one or more other devices. In operation, the system 100 may include computer-readable and computer-executable instructions that reside in storage 1108 on the device 104. The device 104 may be a mobile device, such as a smart phone, tablet, smart watch, or the like.

The device 104 may include one or more controllers/processors 1104 comprising one-or-more central processing units (CPUs) for processing data and computer-readable instructions, and a memory 1106 for storing data and instructions. The memory 1106 may include volatile random access memory (RAM), non-volatile read only memory (ROM), non-volatile magnetoresistive (MRAM) and/or other types of memory. The device 104 may also include a data storage component 1108 for storing data and processor-executable instructions. The data storage component 1108 may include one or more non-volatile storage types such as magnetic storage, optical storage, solid-state storage, etc. The device 104 may also be connected to a removable or external non-volatile memory and/or storage (such as a removable memory card, memory key drive, networked storage, etc.) through the input/output device interfaces 1102.

Executable instructions for operating the device 104 and its various components may be executed by the controller(s)/processor(s) 1104, using the memory 1106 as temporary "working" storage at runtime. The executable instructions may be stored in a non-transitory manner in non-volatile memory 1106, storage 1108, or an external device. Alternatively, some or all of the executable instructions may be embedded in hardware or firmware in addition to or instead of software.

As shown in FIG. 11, the device 104 may include one or more of a variety of sensors. Among the sensors are an audio capture component such as microphone(s) 1150, an image and/or video capture component such as camera(s) 106

(which may include infrared cameras, ultraviolet cameras, etc.), a touch interface 1114, an antenna 1122, positioning sensors 1162, field sensors 1164 (e.g., a 3-axis magnetometer, a gravity sensor), and motion sensors 1166 (e.g., a 3-axis accelerometer, a 3-axis gyroscope). The device 104 may also include one or more buttons (not shown). Several of each of these components may be included. Also, although shown as integrated within device 104, some or parts of the various sensors may be external to device 104 (such as AR glasses 104b, wireless headset 1321, etc.) and accessed through input/output device interfaces 1102 either wirelessly or through a physical connection. The sensors may produce output data that may be used in determining movement signatures, as explained below.

The antenna 1122 and related components (e.g., radio transmitter/receiver/transceiver, modem, etc.) may be configured to operate with a wireless local area network (WLAN) (such as WiFi), Bluetooth, and/or wireless networks, such as a Long Term Evolution (LTE) network, WiMAX network, 3G network, etc.

The audio capture component may be, for example, a microphone 1150 or array of microphones, a wired headset (not illustrated), a wireless headset (e.g., wireless headset 1321 in FIG. 8), etc. If an array of microphones is included, approximate distance to a sound's point of origin may be performed acoustic localization based on time and amplitude differences between sounds captured by different microphones of the array.

The touch interface 1114 may be integrated with a surface of a display 1112 or may be separate (e.g., a touch pad). The touch interface may be of any technology such as capacitive, resistive, optical/infrared, thermal/temperature, piezoelectric, etc. Other pointing devices for interacting with a graphical user interface (GUI) may be included, such as a touchpad, a trackball, or a mouse.

The positioning module 1162 provides an interface for acquiring location information, such as information from satellite geographic positioning system(s). For example, the positioning module 1162 may include a Global Positioning System (GPS) receiver and/or a Global Navigation Satellite System (GLONASS) receiver. The positioning module 1162 may also acquire location-based information using other radio sources (e.g., via antenna 1122), such as mapping services that triangulate off of known WiFi service set identifiers (SSIDs) or cellular towers within range of the device 104.

The field sensor module 1164 provides directional data. The field sensor module 1164 may include a 3-axis magnetometer that measures magnetic fields and may serve as a compass. The field sensor module 1164 may also include a dedicated gravity sensor to determine up-and-down.

The motion sensor module 1166 provides inertial data, and may include 3-axis accelerometer and a 3-axis gyroscope.

The device 104 may also include a variety of other sensors to detect physiological conditions of a user. For example, the device may include a heart rate detector 1163 (such as an electrocardiogram), a temperature sensor 1165, a skin conductance sensor 1160, or the like. Alternatively, these sensors (or others) may be located on a different device (such as a wearable device) that is communicatively connected to device 104. For example, a system may include the device 104 and a wrist-band worn by the user that is capable of detecting the user's heart rate using a heart rate detector 1163 and communicating data regarding the heart rate to the device 104. The wrist-band may be linked to the device 104 so that the device 104 knows that any physiological data collected by the wrist-band belongs to the user of the device 104. In another example, the heart rate detector 1163 and temperature sensor 1165 may be located on a piece of exercise equipment, such as a treadmill.

Examples of other sensors that may be configured on the device include an electronic thermometer to measure ambient temperature and a proximity sensor to detect whether there is an object within a certain distance of the device 104.

Sensors may be communicatively coupled with other components of system 100 via input/output (I/O) device interfaces 1102 and/or via an address/data bus 1124. The address/data bus 1124 conveys data among components of the device 104. Each component within the device 104 may also be directly connected to other components in addition to (or instead of) being connected to other components across the bus 1124.

The I/O device interfaces 1102 may connect to a variety of components and networks. Among other things, the I/O device interfaces 1102 may include an interface for an external peripheral device connection such as universal serial bus (USB), FireWire, Thunderbolt or other connection protocol. The input/output device interfaces 1102 may also support a variety of networks via an Ethernet port and antenna 1122.

The system 100 may also include a video output component for displaying images, such as display 1112. The video output component may be a display of any suitable technology, such as a liquid crystal display, an organic light emitting diode display, electronic paper, an electrochromic display, a pico projector, etc. The video output component may be integrated into the device 104 or may be separate.

The system 100 may also include an audio output component such as a speaker 1118, a wired headset (not illustrated), or a wireless headset (e.g., wireless headset 1321). Other output devices include a haptic effect generator (not illustrated). The haptic effect generator may be of any haptic technology, including technologies to vibrate the entire device 104 (e.g., electromagnetic technologies such as vibratory motor or a coil with a central mass) and/or may comprise technologies allowing the haptic effect to be localized to a position of the touch interface 1114, such as electroactive polymers, piezoelectrics, electrostatics, subsonic audio wave surface actuation, etc.

As discussed above, device 104 includes controller(s)/processors 1104, memory 1106, and storage 1108. In addition, the device 104 may include a user position module 1130 and a rendering engine 1152, each of which may comprise processor-executable instructions stored in storage 1108 to be executed by controller(s)/processor(s) 1104 (e.g., software, firmware), hardware, or some combination thereof. For example, components of the user position module 1130 or rendering engine 1152 may be part of a software application running in the foreground and/or background on the device 104. The rendering engine 1152 actually renders, as in generates the appearance of, a graphical user interface.

The user position module 1130 includes a user selection module 1144. The user selection module may collect data indicating physiological conditions from the camera(s) 106 and from other sensor(s) that may include data indicating a physiological condition. The user selection module 1144 may analyze the data to quantify a physiological condition (for example, determine a heart rate, breathing rate, etc.). The user selection module 1144 may then compare the various physiological conditions detected by the various camera(s)/sensor(s) to identify a match. The user selection module 1144 may then select the individual detected in the matching camera-based physiological condition as the user.

The user position module 1130 includes a head tracking engine 1146, which utilizes the camera(s) 106 (or other components) to estimate a head of the selected user relative to the device 104 as discussed above. For example, the head tracking engine 1146 may detect a position (including distance, angle, etc.) of a user's face or head relative to the device 104 and pass that information to the rendering engine 1152 which will then render the user interface in a manner that positions the user interface based on the user's position relative to the device. The user position module 1130 may also include storage 1148 that stores data used by the user selection module 1144, and/or head tracking engine 1146.

Figure 12:
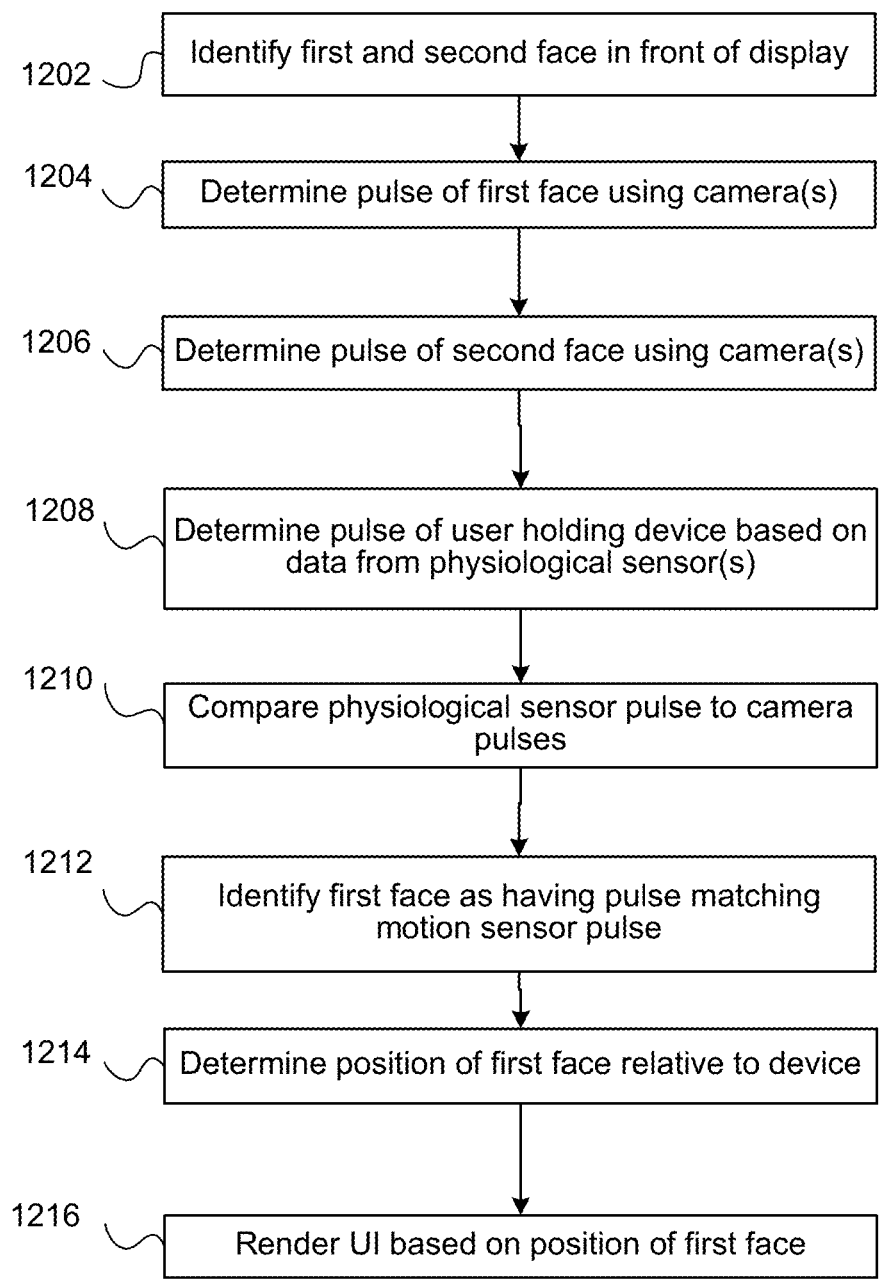
FIG. 12 is an example of an algorithm in accordance with various embodiments.

FIG. 12 illustrates an example algorithm for identifying an individual based on different sensor data to one aspect of the present disclosure. The algorithm is an illustration, and other algorithms using different, reordered, and/or removed steps may also be used. A device, or system including a device, may identify a plurality of faces in front of a display of the device (1202). The plurality of faces may include a first face and a second face. The faces may be detected using one or more cameras of the device. The system may then determine a pulse of the first face (1204) and determine a pulse of the second face (1204). These pulses may be determined using camera(s) of the system. The pulses may be determined by detecting color changes in the faces. Other physiological conditions rather than/in addition to pulse may also be detected depending on system configuration.

The system may then determine a pulse (or other physiological condition) of a user of the device (1208). The user's pulse may be determined using physiological sensor(s) or other sensors of the system. The system may then compare the pulse determined using the physiological sensor(s) to the pulses determined using the camera(s) (1210). The system may then determine which face has a pulse that matches the physiological sensor(s) determined pulse, for example the first face (1212). The first face may thus be determined to be the face associated with the user holding the device. The system may determine the position of the first face relative to the device (1214) and may render the UI based on the position of the first face (1216).

Referring to FIG. 13, different mobile devices 104*a* to 104*e* may contain different components of the system 100 and the devices may be connected over a network 1302 to one or more servers 1340. For example, the smart watch 104*e* may include a heart rate monitor 1163 to communicate with a tablet 104*d* being held by a user. Thus, data regarding physiological conditions detected by one device (such as smart watch 104*e*) may be used to identify a user of a different device (such as tablet 104*d*).

In one embodiment, multiple different devices may coordinate to cross-reference sensor data to identify an individual. For example, data from a smart watch 104*e* worn by one user may be compared to image data taken from a camera of a mobile device 104*d* being operated by another user after a determination is made that the smart watch 104*e* and device 104*d* are in proximity to each other, for example being able to access the same Wi-Fi network or cellular tower, or being close to each other as measured in GPS coordinates.

In one embodiment, the above processes for identifying an individual by cross-reference camera based input and physiological sensor based input may occur in a cloud based environment. For example, one device, for example a networked camera 104*f* (such as a security camera, etc.) may send image data to a server 1340. Another device, such as smart watch 104*e* (or other device) may include a physiological sensor and may send data from the physiological sensor to the server 1340. The server 1340 may also receive an indication that the data from the physiological sensor corresponds to one or more individuals detected by the camera 104*f*. For example, the indication may include a proximity indication as determined by other components, corresponding network addresses from the received data of the camera and/or physiological sensor, or other indication. The server 1340 may then perform the processing to identify physiological features in the data from the camera 104*f* and physiological data from the smart watch 104*e*. The server 1340 may then identify particular individual(s) in the image data from the camera 104*f* that match the particular physiological sensor data form the smart watch 104*e*. The server 1340 may also link multiple different individuals with multiple different physiological sensors.

In one embodiment, such a user identification system may be linked to a payment system, where a user device (such as a smartphone 104*a*, smart watch 104*e*, etc.) may be linked to a user payment account. If a user is at a location with a camera 104*f*, the data from the camera 104*f* may be used to cross reference physiological data from the user's device and payment information associated with the user device to confirm the particular user is the proper individual involved in the payment transaction.

While the above discusses face tracking regarding individuals and users, the individuals described need not by humans and could be non-human individuals such as pets, farm animals, etc. The techniques described above may be useful for tracking such individuals, for example matching a particular individual animal of livestock shown in a herd on a camera feed with physiological sensor data showing an irregular heartbeat may be useful for selecting the individual animal for veterinary care. Other uses for non-human individuals are also possible.

The various aspects can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most aspects utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In aspects utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of aspects, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keypad, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a non-transitory computer-readable storage medium representing remote, local, fixed and/or removable storage devices as well as storage media for temporarily and/or more permanently containing, storing, and retrieving computer-readable information. The system and various devices also typically will include a number of software applications, modules, services or other elements located within at least one working memory device, including an operating system and application programs such as a client application or Web browser. It should be appreciated that alternate aspects may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer-readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device.

Based on the disclosure and teachings provided herein, a person of ordinary skill in the art will appreciate other ways and/or methods to implement the various aspects.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for rendering a position-dependent user interface, the method comprising:
    detecting a first face and a second face using a plurality of cameras of a device, the first face and the second face both determined to be looking at a display of the device;
    monitoring, during a first time period, a first rate of skin-color change of the first face using first data from the plurality of cameras;
    selecting the first rate as a first pulse rate associated with the first face;
    monitoring, during the first time period, a second rate of skin-color change of the second face using the first data;
    selecting the second rate as a second pulse rate associated with the second face;
    receiving, during a second time period, second data including a third pulse rate from a physiological sensor, the physiological sensor detecting the third pulse rate based on physical contact between the device and a user of the device, the physiological sensor being different from the plurality of cameras;
    comparing the first pulse rate to the third pulse rate based on the first time period being within a time threshold of the second time period;
    comparing the second pulse rate to the third pulse rate based on the first time period being within the time threshold of the second time period;
    determining that the first pulse rate is within a certain number of beats-per-minute of the third pulse rate based at least in part on the comparing the first pulse rate to the third pulse rate;
    identifying the first face to be that of the user of the device based at least in part on determining that the first pulse rate is within the certain number of beats-per-minute of the third pulse rate;
    ignoring the second face for head tracking purposes based on identifying the first face to be that of the user of the device;
    selecting the first face for head tracking purposes, the head tracking including determining a position of the first face relative to a plane of the display of the device using data from the plurality of cameras; and
    rendering a user interface for display based on the position of the first face.

2. A computing system, comprising:
    at least one memory; and
    at least one processor coupled to the at least one memory, the at least one processor being configured to:
        detect a first individual in a field of view based on at least one camera output of at least one camera;
        determine a first indicator of a physiological condition of the first individual based on the at least one camera output, the at least one camera output being detected in a first time period;
        determine a second indicator of a physiological condition of a user of a device based on at least one sensor output of at least one physiological sensor, the at least one sensor output being detected in a second time period and the at least one physiological sensor being different from the camera;
determine that the first time period is within a time threshold of the second time period;
compare the first indicator to the second indicator;
determine that the first indicator is within a similarity threshold of the second indicator;
identify the first individual to be the user based on the first indicator being within the similarity threshold of the second indicator; and
render a user interface for display based on a position of the first individual.

3. The computing system of claim 2, wherein the at least one processor is further configured to:
select the first individual for head tracking purposes, the head tracking including determining a location of a head of the first individual relative to a plane of a display based on the at least one camera output; and
render a user interface for the display based on the location.

4. The computing system of claim 2, wherein the at least one processor is further configured to detect a plurality of individuals in the field of view based on the at least one camera output, the plurality of individuals including the first individual.

5. The computing system of claim 4, wherein the plurality of individuals includes a second individual, and the at least one processor is further configured to determine the second individual is not living based on the at least one camera output.

6. The computing system of claim 2, wherein the at least one physiological sensor comprises at least one of a gyroscope, an accelerometer, or a heart rate detector.

7. The computing system of claim 2, wherein a display and the at least one camera are located on a first device and the sensor output is received from a second device.

8. The computing system of claim 2, wherein:
the first indicator of the physiological condition is a characterization of blood flow in a face of the first individual;
the second indicator of the physiological condition is a vibration frequency of the device from being held by the user; and
the at least one processor is further configured to compare the first indicator to the second indicator by determining whether a first heart rate indicated by the blood flow is within a similarity threshold of a second heart rate indicated by the vibration frequency.

9. The computing system of claim 2, wherein:
the first indicator of the physiological condition is a first breathing rate of the first individual;
the second indicator of the physiological condition is a vibration frequency of the device being held by the user; and
the at least one processor is further configured to compare the first indicator to the second indicator by determining whether the first breathing rate is within a similarity threshold of a second breathing rate indicated by the vibration frequency.

10. A non-transitory computer-readable storage medium storing processor-executable instructions for controlling a computing device, comprising program code to configure the computing device to:
detect a first individual in a field of view based on at least one camera output of at least one camera;
determine a first indicator of a physiological condition of the first individual based on the at least one camera output, the at least one camera output being detected in a first time period;
determine a second indicator of a physiological condition of a user of a device based on at least one sensor output of at least one physiological sensor, the at least one sensor output being detected in a second time period and the at least one physiological sensor being different from the camera;
determined that the first time period is within a time threshold of the second time period;
compare the first indicator to the second indicator;
determine that the first indicator is within a similarity threshold of the second indicator;
identify the first individual to be the user based on the first indicator being within the similarity threshold of the second indicator; and
render a user interface for display based on a position of the first individual.

11. The non-transitory computer-readable storage medium of claim 10, wherein the program code further configures the computing device to:
select the first individual for head tracking purposes, the head tracking including determining a location of a head of the first individual relative to a plane of a display based on the at least one camera output; and
render a user interface for the display based on the location.

12. The non-transitory computer-readable storage medium of claim 10, wherein the program code further configures the computing device to detect a plurality of individuals in the field of view based on the at least one camera output, the plurality of individuals including the first individual.

13. The non-transitory computer-readable storage medium of claim 12, wherein the plurality of individuals includes a second individual, and the program code further configures the computing device to determine the second individual is not living based on the at least one camera output.

14. The non-transitory computer-readable storage medium of claim 10, wherein the at least one physiological sensor comprises at least one of a gyroscope, an accelerometer, or a heart rate detector.

15. The non-transitory computer-readable storage medium of claim 10, wherein the computing device comprises a display and the at least one camera and the sensor output is received from a second device.

16. The non-transitory computer-readable storage medium of claim 10, wherein:
the first indicator of the physiological condition is a characterization of blood flow in a face of the first individual;
the second indicator of the physiological condition is a vibration frequency of the device from being held by the user; and
the program code further configures the computing device to compare the first indicator to the second indicator by determining whether a first heart rate indicated by the blood flow is within a similarity threshold of a second heart rate indicated by the vibration frequency.

17. The non-transitory computer-readable storage medium of claim 10, wherein:
the first indicator of the physiological condition is a first breathing rate of the first individual;

the second indicator of the physiological condition is a vibration frequency of the device being held by the user; and the program code further configures the computing device to compare the first indicator to the second indicator by determining whether the first breathing rate is within a similarity threshold of a second breathing rate indicated by the vibration frequency.

\* \* \* \* \*